(12) United States Patent
Gorsica et al.

(10) Patent No.: US 11,049,404 B2
(45) Date of Patent: Jun. 29, 2021

(54) METHODS AND SYSTEMS FOR UNMANNED AIRCRAFT MONITORING IN RESPONSE TO INTERNET-OF-THINGS INITIATED INVESTIGATION REQUESTS

(71) Applicant: Motorola Mobility LLC, Chicago, IL (US)

(72) Inventors: John Gorsica, Round Lake, IL (US); Rachid Alameh, Crystal Lake, IL (US); Zhengping Ji, Hinsdale, IL (US); Yi Wu, Chicago, IL (US); Thomas Gitzinger, Libertyville, IL (US)

(73) Assignee: Motorola Mobility LLC, Chicago, IL (US)

(\*) Notice: Subject to any disclaimer, the term of this patent is extended or adjusted under 35 U.S.C. 154(b) by 290 days.

(21) Appl. No.: 16/269,432

(22) Filed: Feb. 6, 2019

(65) Prior Publication Data
US 2020/0250994 A1 Aug. 6, 2020

(51) Int. Cl.
| | |
|---|---|
| *G08G 5/00* | (2006.01) |
| *G06N 20/00* | (2019.01) |
| *G01C 21/20* | (2006.01) |
| *B64C 39/02* | (2006.01) |

(52) U.S. Cl.
CPC .......... *G08G 5/0034* (2013.01); *B64C 39/02* (2013.01); *G01C 21/206* (2013.01); *G06N 20/00* (2019.01); *G08G 5/0069* (2013.01); *B64C 2201/126* (2013.01)

(58) Field of Classification Search
CPC .... G08G 5/0034; G08G 5/0069; G06N 20/00; B64C 39/02; G01C 21/206

USPC .......................................................... 701/3
See application file for complete search history.

(56) References Cited

U.S. PATENT DOCUMENTS

| | | | | | |
|---|---|---|---|---|---|
| 9,505,494 | B1* | 11/2016 | Marlow | ................ | B64C 39/024 |
| 10,017,249 | B1* | 7/2018 | Tseng | ...................... | B64C 27/20 |
| 10,137,984 | B1* | 11/2018 | Flick | ..................... | G08G 5/006 |
| 10,574,945 | B1* | 2/2020 | Seyfi | .................... | G05D 1/0202 |
| 10,741,087 | B1* | 8/2020 | Picardi | ................ | G05D 1/0094 |
| 10,796,562 | B1* | 10/2020 | Wild | ..................... | G08B 25/10 |

(Continued)

OTHER PUBLICATIONS

"Drones: IoT's Killer App for Commerce", Article published at https://www.ptc.com/en/product-lifecycle-report/drones-iots-killer-app-for-commerce; Published on or before Sep. 12, 2018.

(Continued)

*Primary Examiner* — Yazan A Soofi
(74) *Attorney, Agent, or Firm* — Philip H. Burrus, IV

(57) ABSTRACT

An Internet-of-things device can detect, using one or more sensors, a condition exceeding a predefined condition threshold. If the condition is occurring at a location outside of an area monitored by the sensors of the Internet-of-things device, a communication device can transmit an investigation request to an unmanned aircraft. The investigation request can include a request to monitor an environment at the location. The Internet-of-things device can then receive an event report identifying whether a class of event is or was occurring at the location from the unmanned aircraft. The event report can include one or more event labels. The Internet-of-things device can transform, with an artificial intelligence engine, the one or more event labels into machine learned knowledge in an Internet-of-things knowledge domain.

20 Claims, 6 Drawing Sheets

(56) References Cited

U.S. PATENT DOCUMENTS

| | | | | |
|---|---|---|---|---|
| 2012/0066168 | A1* | 3/2012 | Fadell | G05B 15/02 |
| | | | | 706/52 |
| 2014/0022051 | A1* | 1/2014 | Levien | G05D 1/0202 |
| | | | | 340/5.2 |
| 2016/0107749 | A1* | 4/2016 | Mucci | G08B 29/185 |
| | | | | 701/3 |
| 2016/0206648 | A1* | 7/2016 | Zheng | A23L 7/135 |
| 2016/0266577 | A1* | 9/2016 | Kerzner | G08B 13/19697 |
| 2017/0206648 | A1* | 7/2017 | Marra | G01C 21/20 |
| 2018/0136661 | A1* | 5/2018 | Jeong | G01C 21/3461 |
| 2018/0157911 | A1* | 6/2018 | Lo | G01C 11/02 |
| 2018/0195868 | A1* | 7/2018 | Rezvani | G05D 1/102 |
| 2018/0217591 | A1* | 8/2018 | Wiggins | G05D 1/0094 |
| 2018/0307874 | A1 | 10/2018 | Park | |
| 2019/0025822 | A1* | 1/2019 | Sentosa | G08B 13/19602 |
| 2019/0049275 | A1* | 2/2019 | Pogorelik | G05D 1/0202 |
| 2019/0158340 | A1* | 5/2019 | Zhang | H04B 17/318 |
| 2019/0164019 | A1* | 5/2019 | Djiofack | B64D 47/02 |
| 2020/0064456 | A1* | 2/2020 | Xu | G01S 13/56 |

OTHER PUBLICATIONS

Ismail, Nick, "Ignore the delivery hype, IoT will fuel explosive drone growth for business use", Published Feb. 20, 2018; https://www.information-age.com/iot-drone-growth-business-123470852/.

Kolodny, Lora, "Alarm.com is building drones to monitor your home inside and out", Published Jan. 3, 2017; https://techcrunch.com/2017/01/03/alarm-com-is-building-drones-to-monitor-your-home-inside-and-out/.

* cited by examiner

METHODS AND SYSTEMS FOR UNMANNED AIRCRAFT MONITORING IN RESPONSE TO INTERNET-OF-THINGS INITIATED INVESTIGATION REQUESTS

BACKGROUND

Technical Field

This disclosure relates generally to electronic systems, and more particularly to electronic devices utilizing unmanned aircraft.

Background Art

Advances in technology have transformed computers from large, bulky objects that sat on a desk with a keyboard and monitor into discrete household objects. A modern voice assistant, for example, may look like an ordinary loudspeaker, but be able to receive and process voice commands, send and receive communications across networks, and perform control operations. Sometimes referred to as "Internet-of-things" or "IoT" devices, these modern electronic devices include processors, software, sensors, and logic that can collect, process, and exchange data. While Internet of Things devices can perform limited services, such as monitoring a household temperature, it would be advantageous to have improved systems and methods that expand the capabilities of such devices.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
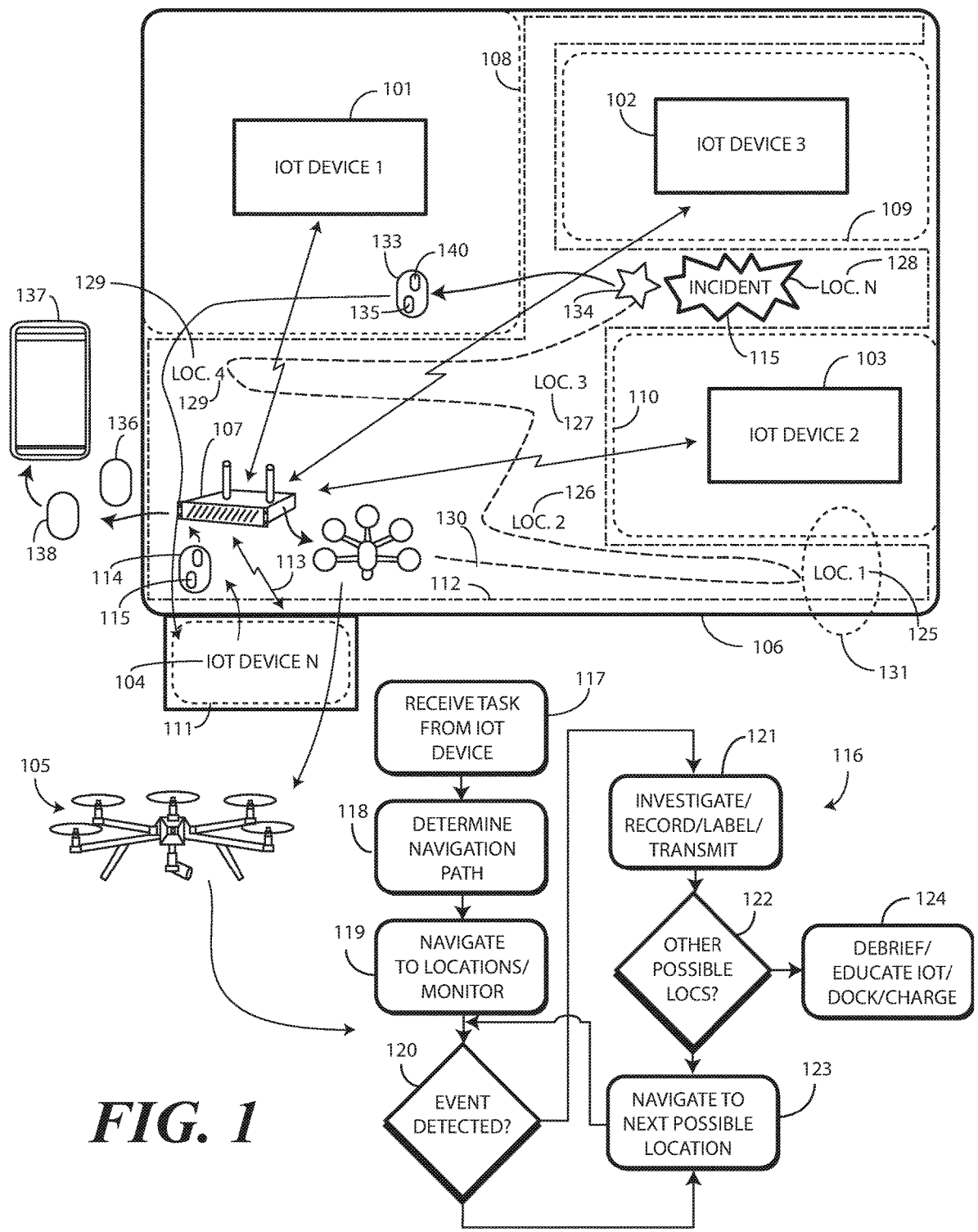
FIG. 1 illustrates explanatory systems and methods in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to training Internet-of-things devices using event reports, optionally with true event labels attached to event data, in a machine learning system to allow the Internet-of-things device to correlate event occurrences beyond a sensor range with sensed data within a sensor range. In one or more embodiments, the event reports are received from an unmanned aircraft, which flies to areas beyond the sensor range, thereby expanding the sensor range of Internet-of-things devices and reporting events back to the Internet-of-things device when detected. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to Internet-of-things devices and/or user interface technology, improve the functioning of the electronic device itself by and improving the overall user experience to overcome problems specifically arising in the realm of the fixed sensor technology associated with prior art Internet-of-things devices.

It will be appreciated that embodiments of the disclosure described herein may be comprised of one or more conventional processors and unique stored program instructions that control the one or more processors to implement, in conjunction with certain non-processor circuits, some, most, or all of the functions of receiving investigation requests at wireless communication circuits carried by an unmanned aircraft from an Internet-of-things device, performing the requested investigations, and delivering an investigation report from the unmanned aircraft to the Internet-of-things device for machine learning to link event data with sensor data as described herein. The non-processor circuits may include, but are not limited to, a radio receiver, a radio transmitter, signal drivers, clock circuits, power source circuits, and user input devices. As such, these functions may be interpreted as steps of a method to perform, for example, the transformation, with an artificial intelligence engine of the Internet-of-things device, one or more event labels received in an event report from an unmanned aircraft into machine learned knowledge in an Internet-of-things knowledge domain of the Internet-of-things device.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that Internet-of-things devices are immobile and, when used in a home, are placed in fixed locations. Accordingly, even when equipped with sensors, these sensors have limited ranges. Illustrating by example, where an Internet-of-things device is a security camera, the field of view of the camera will be limited by walls, doors, and other objects depending upon where it is mounted. A security camera oriented such that its camera monitors a door at the end of a hallway, for instance, will not be able to see windows in other rooms due to the walls and other structural components that stand between the security camera and those other windows.

Embodiments of the disclosure provide a solution to this limited range in that unmanned aircraft are configured to work cooperatively with Internet-of-things devices to extend the range of their sensors, thereby allowing them to fully monitor buildings, homes, and other structures despite being fixedly placed in a single location. In effect, embodiments of the disclosure provide methods and systems that "fill the holes" of sensor coverage of Internet-of-things devices by investigating, in response to investigation requests delivered from the Internet-of-things device to communication circuitry of the unmanned aircraft, environments of one or more investigation locations. In some embodiments, the Internet-of-things device delivers a plurality of investigation locations to the unmanned aircraft, with the unmanned aircraft then investigating each one at time to determine whether a class of event is occurring at any of the investigation locations. In other embodiments, one or more processors of the unmanned aircraft determine a plurality of investigation locations based upon past investigations and/or upon the class of event identified by the investigation request received from the Internet-of-things device.

Illustrating by example, in one embodiment an Internet-of-things device is configured as a utility meter. Using a water meter as an example, a flow sensor in the water meter may determine that water is running inside a home. Since the flow meter is disposed only at the water meter, the processor(s) of the water meter are unable to determine why the water is flowing. In one or more embodiments, the water meter transmits an investigation request to a communication circuit of an unmanned aircraft.

In one or more embodiments, the investigation request identifies a class of event. In this example, the class of event might be the instance of leaking or running water. The communication circuit, which is wireless in one or more embodiments, receives the investigation request from the Internet-of-things device and determines, using one or more processors, one or more investigation locations as a function of the investigation request. Illustrating by example, since water is flowing in this example, the one or more processors of the unmanned aircraft may identify locations within the home where water fixtures, e.g., taps, toilets, tubs, water lines, water hoses, water heaters, etc., are located.

In one or more embodiments, the unmanned aircraft then navigates, using a flight engine, the unmanned aircraft to at least one investigation location selected from those determined as a function of the investigation request. Upon reaching the investigation location, the unmanned aircraft monitors an environment using one or more sensors of the unmanned aircraft. This monitoring is intended to determine whether the class of event identified in the investigation request is occurring at the investigation location. In one or more embodiments, where the monitoring determines that the class of event is occurring at the investigation location, the unmanned aircraft uses its sensors to record event data confirming that the class of event is or was occurring at the at least one investigation location. In this example, this action may include capturing still or video images of the environment at the investigation location to determine if water is visible. The monitoring may also include capturing acoustic signals with a microphone to determine if the sound of water running or dripping can be detected. Other techniques for recording event data and/or determining whether water is leaking or flowing at an investigation location will be obvious to those of ordinary skill in the art having the benefit of this disclosure.

Where the class of event fails to occur at the investigation location, the unmanned aircraft utilizes the flight engine to navigate to another investigation location selected from the plurality of investigation locations determined as a function of the investigation request. Thus, in this example if the unmanned aircraft navigates to a bathroom and fails to detect leaking or running water in any of a shower, tub, toilet, or faucet, it may navigate to the kitchen to perform a similar analysis.

This process can continue until either each investigation location of the plurality of investigation locations is exhausted, or until the one or more sensors of the unmanned aircraft identify that the class of event is or was occurring at one of the investigation locations. Where the one or more sensors identify that the class of event is, or was, occurring at a given investigation location, in one or more embodiments the one or more sensors record event data confirming this fact. In this example, an imager may capture still or video images of water dripping from a faucet or of a toilet running. Alternatively, a microphone may record sounds of water rushing from beneath a vanity.

Thereafter, in one or more embodiments the wireless communication circuit of the unmanned aircraft then transmits an event report to the Internet-of-things device. In one or more embodiments, one or more processors apply one or more labels to the event data in the event report prior to transmitting the event report. These event labels can identify the class of event in one or more embodiments. The event labels can also confirm that the class of event is or was occurring at the at least one investigation location. In one or more embodiments, the one or more processors additionally analyze environmental data captured by the one or more sensors to determine an event severity corresponding to the class of event. Where this occurs, the one or more event labels can identify an event severity corresponding to the class of event.

In one or more embodiments, the Internet-of-things device transmitting the investigation request uses the event report, its event data, and the event labels (where included) to train an artificial intelligence engine to link the event report, its event data, and/or the event labels to a resource consumption profile or signature to more accurately identify sources of consumption. For example, in one or more embodiments the one or more labels applied by the one or more processors of the unmanned aircraft are configured for transformation into machine learned knowledge in an Internet-of-things knowledge domain of an artificial intelligence engine of the Internet-of-things device transmitting the investigation request.

Thus, in one or more embodiments the event report comprises the event data confirming that the class of event is or was occurring at a particular investigation location. The event report can further include location information identifying the investigation location where the class of event was detected as occurring or having occurred. For example, the event report may indicate that water is flowing from beneath a vanity, which is likely due to a burst pipe, in the central bathroom on the second floor of the home.

Where the one or more processors of the unmanned aircraft apply the one or more labels to the event data, such event labels can be used to train the Internet-of-things device via machine learning that, for example, the detected amount of water flow in this instance corresponds to a burst pipe rather than ordinary water usage within the home. The event report can include other information as well, such as event severity. Illustrating by example, by analyzing environmental data captured by the one or more sensors, the one or more processors of the unmanned aircraft may determine that there is half of an inch of standing water on the bathroom floor as well as water running down the stairs.

In one or more embodiments, an artificial intelligence engine of the Internet-of-things device can then use these labels to transform the one or more event labels into machine learned knowledge in an Internet-of-things knowledge domain. For instance, the artificial intelligence engine may begin to identify different types of resource consumption (water usage in this example) from the event labels received from the sensors and processors of the unmanned aircraft. This transformation of knowledge can train the Internet-of-things device without requiring humans to perform operations.

In this example, for instance, when the unmanned aircraft observes normal behaviors corresponding to water usage within the home, true event labels corresponding to these observations can be delivered to the water meter. The water meter can then transform these labels into flows that correspond to specific events without the need of the people within the home to turn ON and OFF various faucets and showers within the home to perform similar training. Other advantages of embodiments of the disclosure will be described below. Still others will be obvious to those of ordinary skill in the art having the benefit of this disclosure.

Turning now to FIG. 1, illustrated therein is one explanatory system 100 configured in accordance with one or more embodiments of the disclosure. The system 100 includes several Internet-of-things devices 101,102,103,104 and an unmanned aircraft 105. The Internet-of-things devices 101, 102,103,104 are positioned within a home 106 in this example. The Internet-of-things devices 101,102,103,104 can communicate with various networks, such as the Internet, with the unmanned aircraft 105, and optionally with each other, using a communication hub. One example of such a communication hub is the router 107 shown in FIG. 1.

The Internet-of-things devices 101,102,103,104 can take various forms. In this illustration, the first Internet-of-things device 101 is configured as a security camera. The second Internet-of-things device 102 is configured as an environmental monitor (here, a smoke detector). The third Internet-of-things device 103 is configured as an acoustically responsive device, and the fourth Internet-of-things device 104 is configured as a utility meter. While these illustrative configurations are examples of Internet-of-things devices that can be used with systems and methods of the disclosure, they are explanatory only. Other examples will be described below with reference to FIG. 5.

Figure 5:
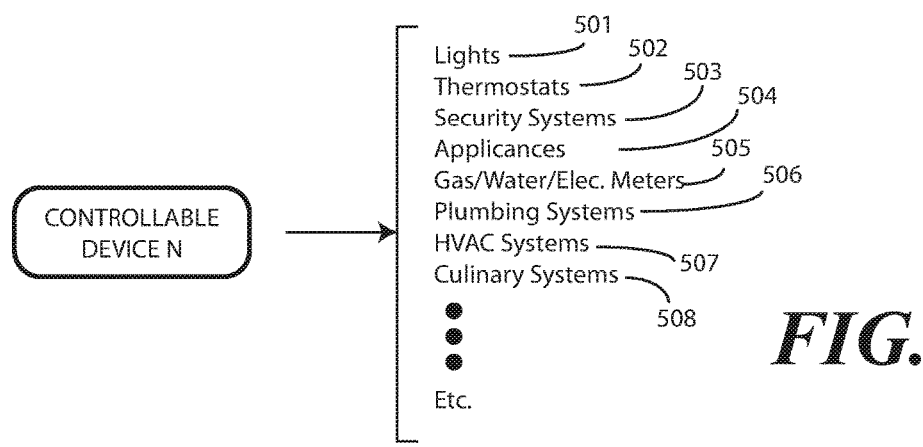
FIG. 5 illustrates one or more explanatory Internet of things devices in accordance with one or more embodiments of the disclosure.

Turning briefly to FIG. 5, examples of Internet-of-things devices include controllable lights 501 and light fixtures, electronic thermostats 502, security systems 503, appliances 504, utility meters 505, plumbing systems 506, HVAC systems 507, culinary systems 508, and so forth. Numerous other Internet-of-things devices will be obvious to those of ordinary skill in the art having the benefit of this disclosure. Also, as the numbers and types of Internet-of-things devices continue to expand, embodiments of the disclosure contemplate that new features and enhancements will be developed with which Internet-of-things devices can interact with mobile devices or adapt their behavior depending on commands received from the central console unit.

Turning now back to FIG. 1, in one or more embodiments, each Internet-of-things device 101,102,103,104 includes one or more sensors. Illustrating by example, the security camera may include an image capture device, a thermal sensor, an acoustic sensor for detecting glass breaking and other unusual sounds, or other sensors. The smoke detector may include not only a sensor for detecting smoke, but a temperature sensor as well. The acoustically responsive device, which can be configured as a voice assistant, can include one or more microphones for receiving voice commands and/or detecting other acoustic energy. The utility meter can include time sensors and flow sensors, with the latter determining amounts of water, gas, electricity, and so forth, that are flowing from the grid into the home 106. Other examples of sensors for Internet-of-things devices will be obvious to those of ordinary skill in the art having the benefit of this disclosure.

Embodiments of the disclosure contemplate that these sensors have limited ranges, fields of view, or fields in which sensors can make detections (angular coverages). However, ideally it would be advantageous for these sensors to have 360-degree field o view, which these sensors lack. Illustrating by example, the security camera may have a sensor range 108 that is limited by walls, furniture, and other objects. The smoke detector may have a sensor range 109 that is limited by not only walls and doors, but by HVAC systems that limit the distance from which active smoke can be detected. The acoustically responsive device may have a sensor range 110 that is limited by acoustically absorptive objects within the home 106 such as rugs, sofas, chairs, beds, artwork, and wallpaper, each of which limits the distance from which sounds can be accurately detected. The utility meter may have a sensor range 111 that is contained within the device itself, as flow meters, time keeping devices, and other consumption measurements can only be made when the resource flows through the meter.

The fact that each Internet-of-things device 101,102,103, 104 has a limited sensor range 108,109,110,111 means that there are areas 112 within the home 106 that cannot be monitored by the sensors of the Internet-of-things devices 101,102,103,104. For example, while a gas meter can use its sensors to determine how much natural gas flows into the home 106, its flow sensor cannot determine whether the sensed natural gas is being consumed by a water heater, stove, oven, or decorative lamp due to the fact that it has a limited sensor range 111. Accordingly, area 112 defines a "hole" or "blind spot" for at least one Internet-of-things device 101,102,103,104.

In one or more embodiments to allow the sensors of each Internet-of-things device 101,102,103,104 to "see" the entire home, one or more of the Internet-of-things devices 101,102,103,104 is configured to wirelessly communicate with the unmanned aircraft 105. In particular, at least one Internet-of-things device 101,102,103,104, upon detecting an incident with its sensor occurring within its sensor range 108,109,110,111, is configured to transmit an investigation request 114 to the unmanned aircraft 105 in one or more embodiments.

Illustrating by example, if Internet-of-things device 104 is configured as a water meter, and detects large volumes of water flowing with its flow meter in its sensor range 111, due to the fact that this sensor range 111 is limited in that the water meter cannot "see" inside the home 106, in one or more embodiments the water meter transmits an investigation request 114 to the unmanned aircraft 105 requesting the unmanned aircraft 105 to investigate areas 112 beyond its sensor range 111 to determine why so much water is flowing.

In one or more embodiments, the investigation request 114 identifies a class of event 115. In one or more embodiments, the investigation request 114 further identifies the class of event 115 is occurring at a location, e.g., within area 112, that is beyond a sensor range 111 of the Internet-of-things device 104 transmitting the investigation request 114.

In this example, the class of event 115 may be excessive water flow into the home 106. While the water meter can detect excessive water flow at its flow meter, it cannot determine where the water is going in the home due to the fact that the spigots, showers, tubs, washing machines, sinks, and so forth are beyond its sensor range 111.

If the Internet-of-things device 101 sending the investigation request 114 was the security camera sensing a glass break sound within its sensor range 108, the class of event 115 may be window breakage. While a microphone of the security camera may detect this sound within its sensor range 108, it may not be able to determine what glass was broken due to the fact that its imager is limited in its field of view to its sensor range 108. Thus, a window breaking in another room would be a class of event occurring beyond the sensor range 108 of the security camera.

A method 116 of processing this investigation request 114 at the unmanned aircraft 105 is also shown in FIG. 1. At step 117, a wireless communication device of the unmanned aircraft 105 receives the investigation request 114 from an Internet-of-things device 101,102,103,104. At step 118, one or more processors of the unmanned aircraft 105 determine one or more investigation locations 125,126,127,128,129 as a function of the investigation request 114.

Step 118 can occur in a variety of ways. In one or more embodiments, the Internet-of-things device 101,102,103, 104 transmits the plurality of investigation locations 125, 126,127,128,129 with the investigation request 114. For example, if the Internet-of-things device 104 sending the investigation request 114 has been programmed with the locations of water fixtures, e.g., shower heads, faucets, appliances, etc., are within the home 106, it can include these locations in the plurality of investigation locations 125,126,127,128,129 included with the investigation request 114. Accordingly, in one embodiment step 118 comprises the one or more processors of the unmanned aircraft 105 determining the one or more investigation locations 125,126,127, 128,129 by receiving the investigation locations 125,126, 127,128,129 in the investigation request 114 from the Internet-of-things device 101,102,103,104 sending the investigation request 114.

In other embodiments, the one or more processors of the unmanned aircraft 105 may determine the plurality of investigation locations 125,126,127,128,129 at step 118. Illustrating by example, in another embodiment step 118 comprises the one or more processors of the unmanned aircraft 105 querying event data stored in a memory of the unmanned aircraft 105. For instance, when the one or more sensors of the unmanned aircraft 105 detect a class of event, e.g., water running, during investigations, the one or more processors of the unmanned aircraft 105 may store this information in memory as event data. When an investigation request 114 is received that identifies a class of event that corresponds to the event data stored in memory, the event data may identify one or more locations 125,126,127,128,129 where the one or more sensors of the unmanned aircraft 105 have previously detected the class of event occurring. Accordingly, in one or more embodiments the one or more processors of the unmanned aircraft 105 determine the one or more locations 125,126,127,128,129 as a function of the class of event identified in the investigation request 114, but without receiving the one or more locations 125,126,127,128 from the Internet-of-things device 101,102,103,104 sending the investigation request 114.

At step 119, the unmanned aircraft 105 then navigates 130, using its flight engine, to a first investigation location 125 selected from the plurality of investigation locations 125,126,127,128,129 determined at step 118. Additionally, at step 119 the unmanned aircraft 105 then uses its sensors to monitor 131 an environment at the first investigation location 125. If, for example, the investigation request 114 included a class of event 115 such as possible fire, in one or more embodiments step 119 can include the unmanned aircraft 105 using an imager to capture still or video images of the environment at the first investigation location 125 to determine whether flames appear in the still or video images. Alternatively, the unmanned aircraft 105 may use a temperature sensor to determine if there is an elevated temperature in the environment at the first investigation location 125. In one or more embodiments, the unmanned aircraft 105 can assess the order of "triggers" in the Internet-of-things device 101,102,103,104, i.e., what happened first, to zoom in on originating event as well. The unmanned aircraft 105 may use a microphone to determine whether crackling sounds are occurring at the environment at the first location 125, and so forth.

By processing inputs received by the sensors of the unmanned aircraft 105, at decision 120 the one or more processors of the unmanned aircraft 105 determine whether the class of event 115 identified in the investigation request 114 is occurring at the first investigation location 125. In this illustration, the class of event 115 identified in the investigation request 114 is not occurring at investigation location 125. Accordingly, where the class of event 115 identified in the investigation request 114 fails to occur at the investigation location 125, the unmanned aircraft 105 uses its flight engine to navigate 132 to at least one other investigation location 126 at step 121.

Once at the next investigation location 126, the unmanned aircraft 105 once again uses its sensors to monitor 131 an environment at the investigation location 126. By processing inputs received by the sensors of the unmanned aircraft 105, at decision 120 the one or more processors of the unmanned aircraft 105 again determine whether the class of event 115 identified in the investigation request 114 is occurring at the first investigation location 126. This process can then repeat until the class of event 115 identified in the investigation request 114 is detected or, alternatively, until the plurality of locations 125,126,127,128,129 is exhausted, as determined at decision 122. Where the unmanned aircraft 105 has navigated to, and monitored, each of the plurality of locations 125,126,127,128,129 without detecting the class of event 115, in one or more embodiments the unmanned aircraft 105 can debrief the Internet-of-things device 101,102,103,104 transmitting the investigation request 114 at step 124 by transmitting an event report 133 identifying the failure of its sensors to detect the class of event 115 identified by the investigation request 114. Optionally, step 124 further includes landing the unmanned aircraft 105 and recharging its energy storage devices.

In the illustrative example of FIG. 1, the class of event 115 is occurring at the fifth investigation location 128. Accordingly, when the unmanned aircraft 105 navigates 132 to the fifth investigation location 128, the one or more processors identify that the class of event 115 is occurring, as identified by decision 120. When this occurs, the method 116 moves to step 121.

At step 121, the one or more sensors of the unmanned aircraft 105 then record event data 134 that confirms the class of event 115 is occurring at the investigation location 128. It should be noted that in some embodiments, the one or more sensors of the unmanned aircraft 105 may record event data 134 that confirms the class of event 115 occurred in the past at the investigation location 128. Illustrating by example, if the class of event 115 was excessive water flow, an imager of the unmanned aircraft 105 may record images of water stains on carpet or furniture, and so forth. Accordingly, in one or more embodiments step 121 comprises recording, with the one or more sensors of the unmanned aircraft 105, that the class of event 115 is or was occurring at the investigation location 128.

In one or more embodiments, step 121 comprises transmitting, with the wireless communication device of the unmanned aircraft 105, an event report 133 to the Internet-of-things device 101,102,103,104 that transmitted the investigation request 114. In one or more embodiments, the event report 113 confirms that the class of event 115 is or was occurring at the investigation location 128. In one or more embodiments, the event report 133 not only identifies that an event is or was occurring at the investigation location 128, but identifies the investigation location 128 as well. In one or more embodiments, the event report 133 further identifies that the class of event 115 is occurring at a location, e.g., area 112, which is outside the sensor range monitored by the Internet-of-things device 101,102,103,104 transmitting the investigation request 114. If, for example, the class of event 115 was excessive water flow, the event report 133 can further include location information identifying the investigation location 128 where the class of event 115 was detected as occurring or having occurred. For example, the event report 133 may indicate that water is flowing from beneath a vanity, which is likely due to a burst pipe, in the central bathroom on the second floor of the home 106, which is outside the area monitored by the water meter, i.e., sensor range 111, and so forth.

In one or more embodiments, the one or more processors of the unmanned aircraft 105 can further apply one or more labels 135 to the event data 134 that is included in the event report 133. The one or more labels 135 can perform a variety of functions. Illustrating by example, in one or more embodiments, the one or more labels 135 can identify the class of event 115. In one or more embodiments, the one or more labels 135 confirm the class of event 115 is or was occurring at the investigation location 128. In one or more embodiments, the one or more labels geographically identify where the investigation location 128 is within the home 106. In one or more embodiments, the one or more labels 135 identify whether the class of event 115 is actively occurring at the investigation location 128.

In one or more embodiments, one or more processors of the unmanned aircraft 105 are configured to analyze environmental data captured by one or more sensors of the unmanned aircraft 105 at the investigation location 128 to determine an event severity corresponding to the class of event 115. Where this occurs, the one or more event labels 135 can identify an event severity corresponding to the class of event 115.

In one or more embodiments, the one or more labels 135 applied to the event data 134 in the event report 133 are configured for transformation into machine learned knowledge in an Internet-of-things knowledge domain of an artificial intelligence engine of the Internet-of-things device 101,102,103,104 transmitting the investigation request 114. Thus, true event labels, for example, can facilitate machine learning in the Internet-of-things device 101,102,103,104 transmitting the investigation request 114. They can allow, for example, the Internet-of-things device 101,102,103,104 transmitting the investigation request 114 to link detected events to higher probability investigation locations to be included in future investigation requests. Additionally, the labels 135 can be used by the Internet-of-things device 101,102,103,104 transmitting the investigation request 114 to share event logs or resource consumption trends with a user by transmitting notifications to a remote electronic device, such as a smartphone belonging to the user. Where the Internet-of-things device 101,102,103,104 transmitting the investigation request 114 is a smart meter, the smart meter can use the one or more labels 135 to link a usage profile or signature measured within its sensor range 108, 109,110,111 to the correct source of consumption occurring in the area 112 beyond the sensor range 108,109,110,111 of the Internet-of-things device 101,102,103,104 transmitting the investigation request 114.

Moreover, the event labels 135 can be used to train the Internet-of-things device 101,102,103,104 transmitting the investigation request 114 via machine learning. The event report 133 can include other information as well, such as event severity 140. Illustrating by example, by analyzing environmental data captured by the one or more sensors, the one or more processors of the unmanned aircraft 105 may determine that there is half of an inch of standing water on the bathroom floor as well as water running down the stairs at investigation location 128.

The Internet-of-things device 101,102,103,104 transmitting the investigation request 114 can then deliver information extracted from the one or more event labels 135 to a user if the resource consumption is unexpected. Illustrating by example, if a toilet within the home 106 is continually running, the Internet-of-things device 101,102,103,104 transmitting the investigation request 114 can, upon receiving the event report 133, send an event notification to a remote electronic device 137, e.g., a smartphone belonging to the user. Additionally, the Internet-of-things device 101, 102,103,104 transmitting the investigation request 114 can compile the one or more event labels 135 received in the most recent event report 133 with other event labels received in other (previous) event reports into an class of event trend log 138. The Internet-of-things device 101,102,103,104 transmitting the investigation request 114 can then transmit, using its communication device, the class of event trend log 138 to a remote electronic device 137 to provide usage trends with a user.

In one or more embodiments, an artificial intelligence engine of the Internet-of-things device 101,102,103,104 transmitting the investigation request 114 thus uses these labels 135 to transform the labels 135 into machine learned knowledge in an Internet-of-things knowledge domain. For instance, the artificial intelligence engine may begin to identify different types of resource consumption (water usage in this example) from the labels 135 received from the sensors and processors of the unmanned aircraft 105. This transformation of knowledge can train the Internet-of-things device 101,102,103,104 transmitting the investigation request 114 without requiring humans to perform operations.

In one or more embodiments, upon receiving an event report 133 identifying whether a class of event 115 is occurring at a particular investigation location 128 from the unmanned aircraft 105, the Internet-of-things device 101, 102,103,104 transmitting the investigation request 114 can provide notifications to users concerning the events. Illustrating by example, in one or more embodiments the Internet-of-things device 101,102,103,104 transmitting the investigation request 114 can, upon receiving the event report 133, transmit an event alert notification 136 to a remote electronic device 137, such as a smartphone, computer, tablet, or other electronic device. In one or more embodiments, the event alert notification 136 can identify that the class of event 115 is or was occurring at the investigation location 128. For instance, the event alert notification 136 might state, "Water detected running in upstairs bathroom and down the stairs—come home quickly!" Other event alert notifications 136, such as the class of event trend log 138, can be sent as well. Still other notifications will be obvious to those of ordinary skill in the art having the benefit of this disclosure.

In some embodiments, the investigation request 114 may not include a class of event 115. Instead, the investigation request 114 may be a generic request that the unmanned aircraft 104 "take a lap" and "see what is going on within the home 106." Alternatively, a generic request may ask the unmanned aircraft 105 to "fly around and identify what people are doing," so that responses to this generic investigation request can be correlated with events being detected within the sensor ranges 108,109,110,111 of the Internet-of-things devices 101,102,103,104 to better detect classes of events in the future.

In response to such an investigation request 114, the unmanned aircraft 105 may simply navigate to various locations of the home 106 to see what people are doing. If, for example, a person is washing dishes in the kitchen, the sensors of the unmanned aircraft 105 can detect this operation. The one or more processors can apply an event label 135 to the event indicating that a dishwashing operation is occurring under normal conditions. The event report 133 can then alert the Internet-of-things device 101,102,103,104 transmitting the investigation request 114 of the activity. The Internet-of-things device 101,102,103,104 transmitting the investigation request 114 can then associate this activity with a detected amount of water flow within its sensor range 111 to train a machine learning algorithm to link the usage profile and/or event signature to the correct source of consumption. Thus, when the unmanned aircraft 105 observes normal behaviors corresponding to, for example, water usage within the home 106, true event labels 135 corresponding to these observations can be delivered to, again for example, the water meter. The water meter can then transform these labels 135 into flows that correspond to specific events without the need of the people within the home 106 to turn ON and OFF various faucets and showers within the home 106 to perform similar training.

Thus, as shown and described in FIG. 1, embodiments of the disclosure fill holes in sensor coverage of Internet-of-things devices 101,102,103,104 by mapping events to investigation locations for the unmanned aircraft 105 to investigate. Thus, the unmanned aircraft 105 can navigate to areas where events are occurring to investigate, record, and optionally label events. An Internet-of-things device 101, 102,103,104 can transmit an investigation request 114 to the unmanned aircraft 105, thereby causing it to investigate for the Internet-of-things device 101,102,103,104 transmitting the investigation request 114. The investigation request 114 can be specific, and can include a class of event 115 the unmanned aircraft 105 is supposed to detect. Alternatively, the investigation request 114 can be generic, simply asking the unmanned aircraft 105 to see what is going on within the home 106. Thus, in one embodiment the unmanned aircraft 105 can investigate based upon event type and context.

When labels 135 are used in an event report 133, the unmanned aircraft 105 can train the Internet-of-things device 101,102,103,104 transmitting the investigation request 114 without requiring human intervention. Illustrating by example, the unmanned aircraft 105 can observe normal behaviors within the home 106 and provide those observations to the Internet-of-things device 101,102,103, 104 transmitting the investigation request 114. These labels 135 can facilitate machine learning in the Internet-of-things device 101,102,103,104 transmitting the investigation request 114. For example, the Internet-of-things device 101,102,103,104 transmitting the investigation request 114 can link event types to potential investigation locations in one embodiment. In another embodiment, the Internet-of-things device 101,102,103,104 transmitting the investigation request 114 can more accurately model resource consumption by knowing what events are occurring in the area 112 outside the sensor range 111 while monitoring the corresponding events occurring within the sensor range 111.

Embodiments of the disclosure thus advantageously solve the problems associated with prior art Internet-of-things devices, which include setup, complexity, maintenance, cost, and mobility. In one or more embodiments the interaction of the unmanned aircraft 105 with an Internet-of-things device 101,102,103,104 transmitting an investigation request 114 solves these problems by providing a single, roving sensor device that replaces the requirement of having a sufficient number of networked Internet-of-things devices to monitor all areas within a home 106. Embodiments of the disclosure allow the labeling of activities in areas 112 outside those monitored by Internet-of-things devices 101, 102,103,104 to create a best-in-class solution. Moreover, the use of a unmanned aircraft 105, which requires no physical installation within the home 106, likely will lead to higher adoption rates of the system 100 compared to networking lots and lots of Internet-of-things devices. For example, its far easier to put a unmanned aircraft 105 configured in accordance with embodiments of the disclosure on a table that it is to professionally install numerous security cameras, video doorbells, and so forth.

Moreover, in contrast to systems where unmanned aircraft are required to have sophisticated sensors that are responsible for detecting unusual people, activities, or sounds that go bump in the night, unmanned aircraft 105 configured in accordance with embodiments of the present disclosure can be simplified, as they are called into action by receiving an investigation request 114 from an Internet-of-things device 101,102,103,104. Advantageously, the unmanned aircraft 105 can remain in a low power or sleep mode until the investigation request 114 is received from the Internet-of-things device 101,102,103,104 transmitting the investigation request 114. This is in contrast to prior art systems where unmanned aircraft must remain constantly vigilant to perform internal detection of events. With embodiments of the disclosure, power is conserved until it is needed, e.g., when the wireless communication device of the unmanned aircraft 105 receives the investigation request from an Internet-of-things device 101,102,103,104 transmitting the investigation request 114.

With embodiments of the disclosure, the unmanned aircraft 105 is not confined or dedicated to a particular domain, such as a mineshaft or oilrig. What's more, the unmanned aircraft 105 is not confined to a sensor range 108,109,110, 111 associated with a particular Internet-of-things device 101,102,103,104. To the contrary, the unmanned aircraft 105 is allowed to roam to areas 112 outside these sensor ranges 108,109,110,111 to allow the Internet-of-things device 101, 102,103,104 transmitting an investigation request 114 to expand their effective sensor ranges to all locations within a home 106. Embodiments of the disclosure further are focused on the unmanned aircraft 105 capabilities and behaviors within the domain of the home.

While prior art systems may employ unmanned aircraft to help with additional monitoring of a sensor range corresponding to the Internet-of-things device, embodiments of the disclosure use unmanned aircraft 105 to monitor areas 112 that are monitored, but not visible, to the Internet-of-things device 101,102,103,104 transmitting an investigation request 114. Thus, while prior art systems use an Internet-of-things device to deploy unmanned aircraft to the Internet-of-things device, embodiments of the disclosure are different in that they deploy unmanned aircraft 105 to locations monitored by an Internet-of-things device 101,102,103,104 transmitting an investigation request 114, not to the Internet-of-things device itself.

Moreover, while prior art systems merely provide video coverage by delivering a video stream to a user, in embodiments of the disclosure sensors carried by unmanned aircraft 105 can determine, for example, that a faucet is dripping or a stove is ON autonomously. This distinction is important, as it allows the unmanned aircraft 105 to train the Internet-of-things device 101,102,103,104 transmitting an investigation request 114 autonomously. In contrast to user-based tagging, which is tedious, in embodiments of the disclosure the unmanned aircraft 105 applies real event labels 135 to event data 134 in an event report 133 so that the Internet-of-things device 101,102,103,104 transmitting an investigation request 114 can use an artificial intelligence engine to better monitor the home 106. While prior art systems are only alarm based, e.g., for monitoring home break-ins, unexpected garage door openings, fires, and so forth, embodiments of the disclosure use generic investigation requests to cause a unmanned aircraft 105 to monitor normal activities such as seeing the dishwasher running for the purposes of performing a water consumption analysis, and so forth.

Embodiments of the disclosure allow for unmanned aircraft 105 to be sent to investigate automatically, even when users are away from the home 106. An Internet-of-things device 101,102,103,104 transmitting an investigation request 114 can cause the unmanned aircraft 105 to investigate a particular event that the Internet-of-things device 101,102,103,104 transmitting the investigation request 114 may not have enough sensor range to fully characterize. Moreover, the Internet-of-things device 101,102,103,104 transmitting an investigation request 114 can share event details with the unmanned aircraft 105 in the investigation request 114, thereby allowing the unmanned aircraft 105 to be more efficient in seeking out event location. This is especially true where the class of event 115 is rare or intermittent. The Internet-of-things device 101,102,103,104 transmitting an investigation request 114 can therefore use the investigation request 114 to give the unmanned aircraft 105 a head start and early knowledge prior to investigating. In one or more embodiments, the unmanned aircraft 105 can have stored in a memory banks of categories defining potential sources of issues, e.g., potential culprits, places for water leaks, potential places for intrusion, and so forth. These banks of stored categories can allow the unmanned aircraft 105 to become efficient in searching and seeking in response to a received investigation request 114. In other embodiments, the class of event 115 identified by the investigation request 114 may cause the unmanned aircraft 105 to query the Internet-of-things device 101,102,103,104 transmitting the investigation request 114 for additional information relating to the class of event, event type, and/or location.

In one or more embodiments, a database is pre-loaded in a memory of the unmanned aircraft 105. In one or more embodiments, the database links similar things into domains and defines their relative locations, e.g., what rooms within the home 106, what floors of the home 106, all water sources and/or faucets of the home 106, all doors of the home 106, all televisions of the home 106, and so forth. The unmanned aircraft 105 can then consider this history, which can optionally be supported by an artificial intelligence engine and corresponding training, to pinpoint events and likely sources within each domain based on learned history, time of day, context, indoor/outdoor environment, and people present. This is in stark contrast to prior art solutions.

In one or more embodiments, one or both of the Internet-of-things device 101,102,103,104 transmitting an investigation request 114 or the unmanned aircraft 105 include an artificial intelligence engine. Where included in the unmanned aircraft 105, for example, this artificial intelligence engine can receive inputs and/or control settings from the one or more Internet-of-things devices 101,102,103,104 and transform the inputs and control settings into machine learned knowledge stored in a domain of the memory. In one or more embodiments, the unmanned aircraft 105 can combine multiple investigation requests 114 from multiple Internet-of-things devices 101,102,103,104 to zoom in on event based on locations of the Internet-of-things devices 101,102, 103,104. In one or more embodiments, one or more processors of the unmanned aircraft 105 can perform a control operation to alter a behavior of the Internet-of-things device 101,102,103,104 transmitting an investigation request 114 by way of the event report 133. For example, if the Internet-of-things device 101,102,103,104 transmitting an investigation request 114 identifies a glass break situation as a class of event 115, and the unmanned aircraft 105 detects a broken window, the event report 133 can cause the Internet-of-things device 101,102,103,104 transmitting the investigation request 114 to call the police, and so forth. By receiving event reports 133, the Internet-of-things device 101,102, 103,104 transmitting an investigation request 114, and more particularly the artificial intelligence engine in the Internet-of-things device 101,102,103,104 transmitting an investigation request 114, can become smarter about the people who experience life within the home 106.

In one or more embodiments, one or more of the Internet-of-things devices 101,102,103,104 can include an artificial intelligence engine that maintains a knowledge domain of the home 106. The artificial intelligence engine can include machine-learned knowledge about the home that has been built upon one or both of events detected within the sensor ranges 108,109,110,111 event data 134 received in the form of event reports 133 received from the unmanned aircraft 105. For example, the artificial intelligence engine can detect inputs within its sensor range 108,109,110,111 and/or receive event data 134 from event reports 133. Thereafter, the artificial engine can transform the inputs and/or event data 134 into machine-learned knowledge kept in an Internet-of-things knowledge domain stored in the memory of the Internet-of-things device 101,102,103,104.

In one or more embodiments, the Internet-of-things knowledge domain comprises machine-learned information. In one or more embodiments, the Internet-of-things knowledge domain may be stored in a database. In another embodiment, the Internet-of-things knowledge domain may be learned in weights used by a neural network. In another embodiment, the Internet-of-things knowledge domain may take some other form usable by machine learning algorithms.

Figure 2:
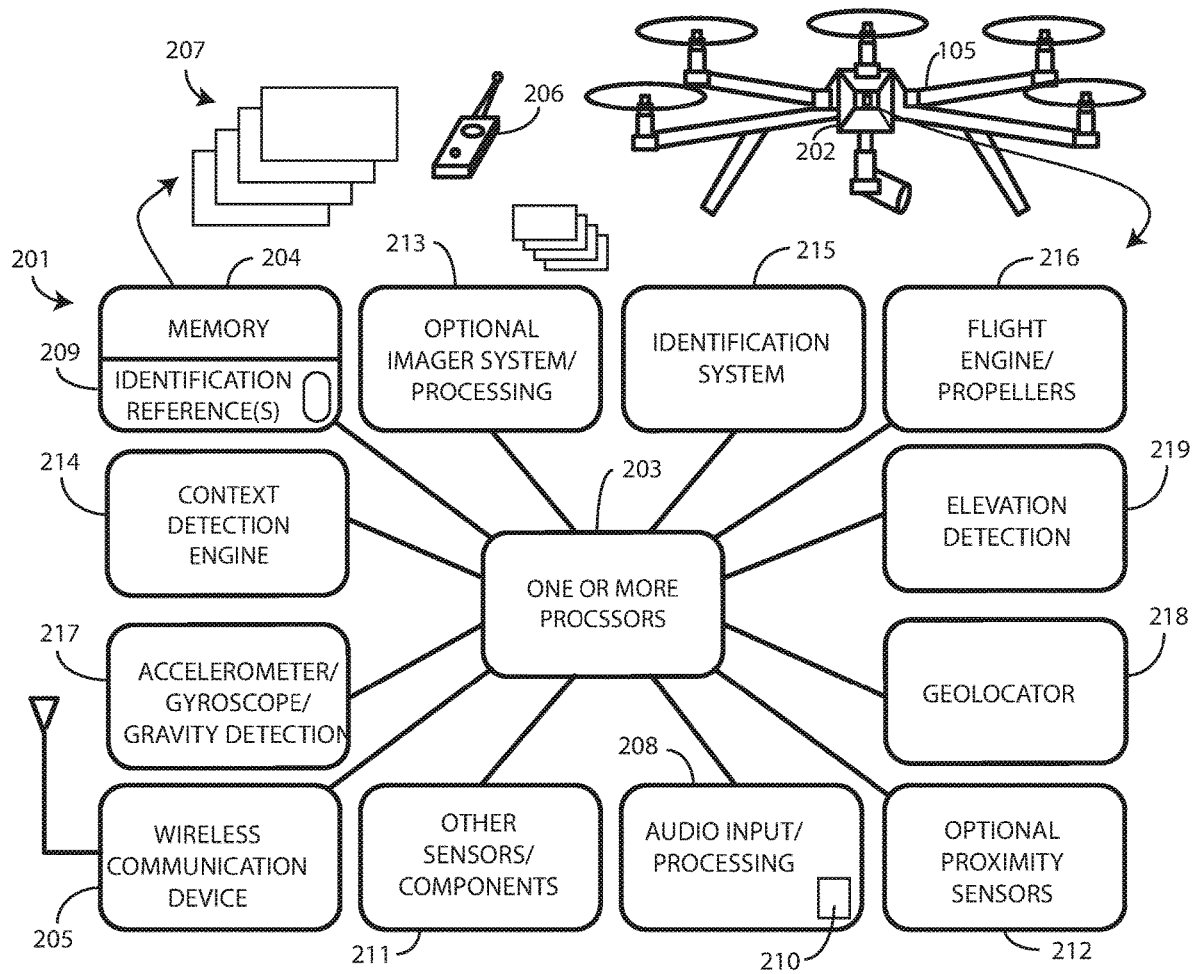
FIG. 2 illustrates one explanatory unmanned aircraft in accordance with one or more embodiments of the disclosure.

Turning now to FIG. 2, illustrated therein is one explanatory unmanned aircraft 105 configured in accordance with one or more embodiments of the disclosure. An explanatory block diagram schematic 201 is also shown in FIG. 2. The block diagram schematic 201 can be configured as a printed circuit board assembly disposed within a housing 202 of the unmanned aircraft 105. Various components can be electrically coupled together by conductors or a bus disposed along one or more printed circuit boards.

The illustrative block diagram schematic 201 of FIG. 2 includes many different components. Embodiments of the disclosure contemplate that the number and arrangement of such components can change depending on the particular application. Accordingly, drones and unmanned aerial vehicles configured in accordance with embodiments of the disclosure can include some components that are not shown in FIG. 2, and other components that are shown may not be needed and can therefore be omitted.

In one embodiment, the unmanned aircraft 105 includes one or more processors 203. The one or more processors 203 can include a microprocessor, a group of processing components, one or more ASICs, programmable logic, or other type of processing device. The one or more processors 203 can be operable with the various components of the block diagram schematic 201. The one or more processors 203 can be configured to process and execute executable software code to perform the various functions of the unmanned aircraft 105 with which the block diagram schematic 201 operates. A storage device, such as memory 204, can optionally store the executable software code used by the one or more processors 203 during operation.

In this illustrative embodiment, the block diagram schematic 201 also includes a wireless communication device 205 that can be configured for wireless communication with a control device 206, or alternatively with one or more other devices. The wireless communication device 205 may utilize wireless technology for communication, such as, but are not limited to, peer-to-peer or ad hoc communications, as well as other forms of wireless communication. The wireless communication device 205 can include wireless communication circuitry, one of a receiver, a transmitter, or transceiver, and one or more antennas.

In one or more embodiments, the wireless communication device 205 is configured to receive an investigation request (114) from an Internet-of-things device (101,102,103,104). In one or more embodiments, the investigation request (114) requests the unmanned aircraft (105) to investigate an area beyond another area monitored by the Internet-of-things device (101,102,103,104). Said differently, in one or more embodiments the investigation request (114) requests the unmanned aircraft 105 to investigate an area (112) beyond a sensor range (108,109,110,111) of the Internet-of-things device (101,102,103,104) transmitting the investigation request (114).

In one embodiment, the one or more processors 203 can be responsible for performing the primary functions of the unmanned aircraft 105 with which the block diagram schematic 201 is operational. The executable software code used by the one or more processors 203 can be configured as one or more modules 207, which can include a voice recognition engine, a facial recognition engine, or combinations thereof in one embodiment, and that are operable with the one or more processors 203. Such modules 207 can store instructions, control algorithms, and so forth.

Illustrating by example, in one or more embodiments the one or more processors 203 cause a flight engine 216, described in more detail below, to navigate the unmanned aircraft 105 to at least one investigation location (125,126, 127,128,129) beyond the another area in response to the investigation request (114). Said differently, in one or more embodiments the one or more processors 203 can cause the flight engine 216 to navigate the unmanned aircraft 105 to at least one investigation location (125,126,127,128,129) beyond a sensor range (108,109,110,111) of the Internet-of-things device (101,102,103,104) transmitting the investigation request (114). Additionally, the one or more processors 203 can cause the one or more sensors and components 211 of the unmanned aircraft 105 to monitor an environment at the at least one investigation location. The unmanned aircraft 105 can combine its finding with a received investigation request (114) for clearer reporting in one or more embodiments.

With reference to this monitoring operation, in one or more embodiments the block diagram schematic 201 includes an audio processing engine 208 that functions in coordination with the one or more processors 203 in one or more embodiments. In one or more embodiments, the audio processing engine 208 is capable of receiving audio input, processing audio input, extracting one or more audio characteristics from received audio input, storing one or more acoustic signatures or the extracted audio characteristics as identification references 209 in the memory 204, and performing other functions. For example, in one or more embodiments the audio processing engine 208 is operable to receive audio input from an environment about the unmanned aircraft 105.

The audio processing engine 208 can include hardware, executable code, and speech monitoring and generation executable code in one embodiment. The audio processing engine 208 can be operable with one or more identification references 209 stored in memory 204. These identification references 209 can include audio characteristics extracted from received audio input, acoustic signatures of events such as running water, breaking glass, fire crackling, and so forth, audio identification models, or other data structures suitable for use by the one or more processors 203 to uniquely identify received acoustic input.

For instance, with reference to audio input, the identification references 209 can comprise representations of event sound models, representations of synthesized event sound models, voice signatures for identifying persons within the home (106), or other representations of predefined audio sequences that are used by the audio processing engine 208 or the one or more processors 203 to receive and identify sounds within the home (106), whether emanating from people or from events, e.g., running water or breaking glass, which are captured by an audio capture device such as the one or more microphones 210. (In some situations the audio processing engine 208 is supported by other device sensors.) In one embodiment, the audio processing engine 208 can include an acoustic event recognition engine. In one embodiment, the audio processing engine 208 can access various event sound and/or speech models stored with the identification references 209 to identify not only persons within the home (106) but events that are occurring as a function of acoustic signatures extracted from the audio input signals corresponding to those speech commands.

The audio processing engine 208 can be operable with one or more microphones 210. Illustrating by example, a first microphone can be located on a first side of the unmanned aircraft 105 for receiving audio input from a first direction, while a second microphone can be placed on a second side of the unmanned aircraft 105 for receiving audio input from a second direction.

Other sensors and components 211 can be operable with the one or more processors 203. General examples of the sensors included with the other sensors and components 211 include time sensors, environmental sensors, weather sensors, location sensors, and so forth. These sensors or components 211 can be used alone or in various combinations. These other sensors and components 211 can include light sensors, magnetometers, laser measuring devices, and so forth. The other sensors and components 211 can include input and output components, such as power inputs and outputs and/or mechanical inputs and outputs. Still other components will be obvious to those of ordinary skill in the art having the benefit of this disclosure.

A temperature sensor can be configured to monitor the temperature of the environment about the unmanned aircraft 105. A light sensor can be used to detect whether or not ambient light is incident on the housing 202 of the unmanned aircraft 105. A location sensor can be included for determining a location and/or movement of the unmanned aircraft 105. Other examples of sensors will be obvious to those of ordinary skill in the art having the benefit of this disclosure.

The other sensors and components 211 can also include a motion sensor, which can include one or more accelerometers or gyroscopes. In one embodiment the motion sensors are operable to detect movement, and direction of movement, of the unmanned aircraft 105. The motion sensors can optionally be configured as an orientation detector that determines an orientation and/or movement of the unmanned aircraft 105 in three-dimensional space. The orientation detector can determine the spatial orientation of an unmanned aircraft 105 in three-dimensional space by, for example, detecting a gravitational direction. The other sensors and components 211 can also be radio frequency receivers receiving beacon transmissions from remote devices as well.

The unmanned aircraft 105 can optionally include one or proximity sensors 212. The proximity sensors 212 can include only a signal receiver to receive signals from objects external to the housing 202 of the unmanned aircraft 105. In one embodiment, the signal receiver is an infrared signal receiver to receive an infrared emission from an object such as a human being when the unmanned aircraft 105 is approaching a person. In one or more embodiments, the proximity sensors 212 are configured to receive infrared wavelengths of about four to about ten micrometers. This wavelength range is advantageous in one or more embodiments in that it corresponds to the wavelength of heat emitted by the body of a human being.

The proximity sensors 212 can also include transmitter/receiver pairs. These sensors including both a signal emitter and a corresponding signal receiver can be any one of various types of proximity sensors, such as but not limited to, capacitive, magnetic, inductive, optical/photoelectric, imager, laser, acoustic/sonic, radar-based, Doppler-based, depth, thermal, and radiation-based proximity sensors. In one or more embodiments they include infrared transmitters and receivers.

The unmanned aircraft 105 can optionally include an imaging system 213. The imaging system 213 can include an imager. In one embodiment, the imager comprises a two-dimensional imager configured to receive at least one image of an environment of the unmanned aircraft 105. In one embodiment, the imager comprises a two-dimensional Red-Green-Blue (RGB) imager. In another embodiment, the imager comprises an infrared imager. Other types of imagers will be obvious to those of ordinary skill in the art having the benefit of this disclosure.

The imaging system 213 can also optionally include a depth scanner. Where included, the depth scanner can take a variety of forms. In a first embodiment, the depth scanner comprises a pair of imagers separated by a predetermined distance, such as three to four images. This "stereo" imager works in the same way the human eyes do in that it captures images from two different angles and reconciles the two to determine distance.

In another embodiment, the depth scanner employs a structured light laser. The structured light laser projects tiny light patterns that expand with distance. These patterns project on a surface, such as a user's face or an appliance or a piece of furniture, and are then captured by an imager. By determining the size and spacing between the elements of the pattern, three-dimensional mapping can be obtained.

In still another embodiment, the depth scanner comprises a time of flight device. Time of flight three-dimensional sensors include a laser that emits laser light, with a photodiode array receiving reflected light. These pulses reflect back from a surface, such as the user's face or an appliance or a piece of furniture. The time it takes for pulses to move from the photodiode array to the surface and back determines distance, from which a three-dimensional mapping of a surface can be obtained. Where included, the depth scanner adds a third "z-dimension" to the x-dimension and y-dimension defining the two-dimensional image captured by the imager of the imaging system 213.

Other components can be operable with the one or more processors 203, and can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker or other alarms and/or buzzers.

A context engine 214 can then operable with the various sensors to detect, infer, capture, and otherwise identify events, persons, and/or actions that are occurring in the home (106). For example, where included one embodiment of the context engine 214 determines assessed contexts and frameworks using adjustable algorithms of context assessment employing information, data, and events. These assessments may be learned through repetitive data analysis. The context engine 214 can comprise an artificial neural network or other similar technology in one or more embodiments.

In one or more embodiments, the context engine 214 is operable with the one or more processors 203. In some embodiments, the one or more processors 203 can control the context engine 214. In other embodiments, the context engine 214 can operate independently, delivering information gleaned from detecting multi-modal social cues, emotional states, moods (such as eminent fear), and other contextual information to the one or more processors 203. The context engine 214 can receive data from the various sensors. In one or more embodiments, the one or more processors 203 are configured to perform the operations of the context engine 214.

The unmanned aircraft 105 can also include an identification system 215. The identification system 215 can be used to compare audio characteristics extracted from received audio input to stored audio characteristics to determine whether the received audio input and the stored audio input sufficiently match. Such audio matching can allow the one or more processors 203 to identify whether a class of event (115) identified in an investigation request (114) is occurring within an environment of the unmanned aircraft 105.

The identification system 215 can also be operable with the imaging system 213, where included. The identification system 215 can optionally include an object/face/context analyzer configured to process an image or depth scan of an object and determine whether the object matches predetermined criteria by comparing the image or depth scan to one or more predefined identification references 209 stored in memory 204.

For example, the object/face/context analyzer can identify objects using image recognition, character recognition, visual recognition, facial recognition, color recognition, shape recognition, and the like. Advantageously, the object/face/context analyzer, operating in tandem with the identification system 215, can be used as an object recognition device to identify objects within the home (106) and/or as a facial recognition device to determine the identity of one or more persons detected within the home (106).

The unmanned aircraft 105 can further include a flight engine 216. In one embodiment, the flight engine 216 can include one or more rotary wings. Illustrating by example, the flight engine 216 can include four, six, or eight or more rotors configured as propellers. These propellers can be movable between a generally downward oriented direction to directions tilting forward, aft, and side-to-side so as to move the unmanned aircraft 105 up and down and side to side as desired.

In another embodiment, the flight engine 216 can include an air storage bladder, similar to that used in a blimp. Warm air or buoyant gas can be stored in the bladder to give the unmanned aircraft 105 lift. Releasing the buoyant gas or cooling the air can cause the unmanned aircraft 105 to sink. Of course, combinations of rotary wings and the air storage bladder can be used as well.

The one or more processors 203 can perform analysis operations on inputs received from the various sensors described above. Illustrating by example, in one or more embodiments the one or more processors 203 can analyze environmental data captured by the one or more sensors and determining whether a class of event (115) is or was occurring at the at least one investigation location. Where it is, or was, the one or more processors can cause the one or more sensors to record event data confirming that the class of event is or was occurring at the at least one investigation location. The one or more processors 203 can further cause the wireless communication device 205 to transmit an event report (133) identifying the class of event (115) is or was occurring at the at least one investigation location.

The one or more processors 203 can also analyze the environmental data captured by the various sensors to determine an event severity corresponding to the class of event (115). If, for example, the class of event (115) is a glass break, the one or more processors 203 can analyze images from the image capture device 213 can determine the amount of glass broken from a window, for example. If the class of event (115) is a fire, the one or more processors 203 can analyze input from the temperature sensor to determine the amount of thermal energy, and so forth. Where the one or more processors 203 determine the event severity, in one or more embodiments this is included with the event report (133). Thus, in addition to identifying whether the class of event (115) is or was occurring at an investigation location, or whether the class of event (115) is actively occurring at the investigation location, in one or more embodiments the event report (133) can identify the event severity as well.

This information can be included in the event report as one or more event labels, as previously described. The one or more event labels can, for example, identify the class of event. Where the one or more processors further analyze environmental data captured by the one or more sensors to determine an event severity corresponding to the class of event, the one or more event labels can identify an event severity corresponding to the class of event. The one or more event labels can further identify whether the class of event is actively occurring at the at least one investigation location. Other uses for the event labels, which are configured as true data labels in one or more embodiments, will be obvious to those of ordinary skill in the art having the benefit of this disclosure.

In most applications, the unmanned aircraft 105 is configured to navigate autonomously using the plurality of investigation locations (125,126,127,128,129) that are either identified in the investigation request (114) by the Internetof-things device (101,102,103,104) transmitting an investigation request (114), or those that are identified by the one or more processors 203 of the unmanned aircraft 105. However, embodiments of the disclosure contemplate that while the primary function for the unmanned aircraft 105 is extending the sensor range (108,109,110,111) of the various Internet-of-things devices (101,102,103,104), it can be advantageous to allow manual control of the unmanned aircraft 105 at times as well.

To provide this capability, in one or more embodiments, an operator or "pilot" can use the control device 206 to control the flight engine 216 to move the unmanned aircraft 105 as desired in one or more embodiments. In other embodiments, one or more firmware modules 207 can be stored in the memory 204 so that the unmanned aircraft 105 can perform flight operations and can fly flight patterns autonomously in response to Internet-of-things device (101, 102,103,104) transmitting investigation requests (114) as previously described. Of course, a combination of user driven control through the control device 206 and autonomous flight action can also be implemented.

In one or more embodiments, the flight engine 216 can include an energy storage device, such as a lithium-ion or lithium-polymer battery, that selectively propels the rotary wings or propellers in response to control signals from the one or more processors 203. Each propeller can be a two, three, four, or more bladed assembly. Increasing propeller blades decreases noise and increases thrust, while decreasing propeller blades increases efficiency. The exact number of blades or propellers can be selected based upon design, geographic location, typical wind and weather conditions, and so forth. In one or more embodiments, the one or more processors 203 can deliver control signals to the flight engine 216 to adjust and change the speeds of each motor driving each propeller to control the speed, direction, and motion of the unmanned aircraft 105.

In one or more embodiments, the unmanned aircraft 105 includes one or more orientation sensors 217, such as one or more accelerometers, gyroscopes, gravity detectors, or other devices that can determine the azimuth, plumb, and tilt of the unmanned aircraft 105 when in operation. For example, an accelerometer may be used to show vertical orientation, constant tilt and/or whether the unmanned aircraft 105 is stationary or in motion. A gyroscope can be used in a similar fashion. In addition to, or instead of, an accelerometer and/or gyroscope, an electronic compass can be included to detect the spatial orientation of the unmanned aircraft 105 relative to the earth's magnetic field.

The orientation sensors 217 can be used to determine the spatial orientation of the unmanned aircraft 105 when in operation as well. In one embodiment, the one or more orientation sensors 217 make such determinations by detecting a gravitational direction. An optional geolocator 218 can determine a latitude and longitude coordinate location for the unmanned aircraft 105. In one embodiment, geolocator 218 comprises a Global Positioning System (GPS) device that determines latitudinal and longitudinal coordinates from a constellation of one or more earth orbiting satellites or from a network of terrestrial base stations. Other systems can be used in place of the GPS system, such as the Global Orbiting Navigation System (GLONASS) or other satellite positioning systems. The geolocator 218 may also be able to determine location of the unmanned aircraft 105 by locating or triangulating terrestrial base stations of a traditional cellular network or from other local area networks.

An elevation detector 219, such as an altimeter, can be included to determine an altitude of the unmanned aircraft 105 while in operation. Other components could be included as well, as the unmanned aircraft 105 of FIG. 2 is illustrative only. Numerous other configurations will be obvious to those of ordinary skill in the art having the benefit of this disclosure.

Figure 3:
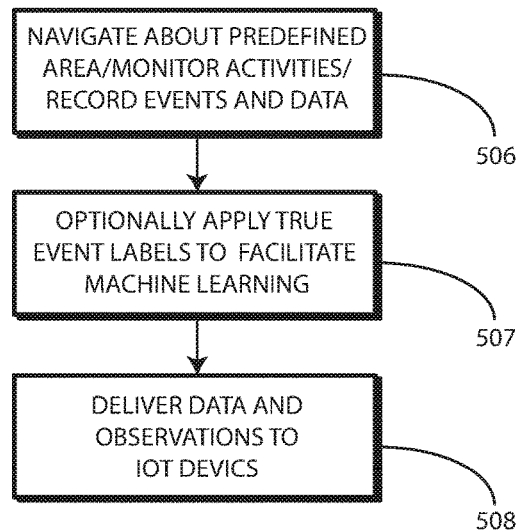
FIG. 3 illustrates one explanatory method in accordance with one or more embodiments of the disclosure.

Recall from above that the unmanned aircraft 105 can receive either specific investigation requests or generic investigation requests from the various Internet-of-things devices (101,102,103,104). With the specific investigation request, the Internet-of-things device (101,102,103,104) transmitting the investigation request (114) identifies a class of event (115) that it wants the unmanned aircraft 105 to investigate. With the generic investigation request, the Internet-of-things device (101,102,103,104) transmitting the investigation request (114) simply wishes to know what is going on in the area (112) outside its sensor range (108,109, 110,111). In still other embodiments, the one or more processors 203 of the unmanned aircraft 105 can cause the unmanned aircraft 105 to perform investigations without receiving an investigation request (114). Turning now to FIG. 3, illustrated therein is one explanatory method 300 by which this can occur.

Beginning at step 301, one or more processors of an unmanned aircraft determine one or more investigation locations to search. Since there is no investigation request, in one or more embodiments the one or more processors of the unmanned aircraft determine the investigation locations either as a function of sensor signals, e.g., the microphone hears water running and moves toward the sound, or as a function of a past navigation history, e.g., the unmanned aircraft monitored bathrooms last, so bedrooms are next, and so forth. The one or more processors further cause the unmanned aircraft to navigate to at least one investigation location with the flight engine at step 301 as well.

Step 301 can also include capturing event data. In one or more embodiments, step 301 includes recording, with one or more sensors, event data at the investigation location. Since no investigation request is received, the event data simply records activities that are occurring, rather than confirming that a particular class of event is occurring.

The recording might detect, for example, that a person in the home is cooking dinner. In one or more embodiments, the one or more processors of the unmanned aircraft may apply one or more event labels identifying this fact to the event data at step 302. At step 303, an event report identifying this activity, along with the event labels applied at step 302, is transmitted with a wireless communication circuit to at least on Internet-of-things device. Continuing this example, the event report could be transmitted to a smart gas meter or smart electric meter at step 303 so that machine learning therein could identify gas or electricity consumption having certain usage characteristics corresponds to the activity of cooking, and so forth.

Thus, using the method 300 of FIG. 3, the unmanned aircraft may simply navigate to various locations of the home, in response to its own processors rather than a received navigation request, to see what people are doing. If, for example, a person is washing dishes in the kitchen, the sensors of the unmanned aircraft can detect this operation at step 301. The one or more processors can apply a label to the event indicating that a dishwashing operation is occurring under normal conditions at step 302. The event report sent at step 303 can then alert an Internet-of-things device of the activity. The Internet-of-things device can then monitor conditions within its sensor range, associating this activity with those findings to train a machine learning algorithm to link the usage profile and/or event signature to the correct source of consumption.

Figure 4:
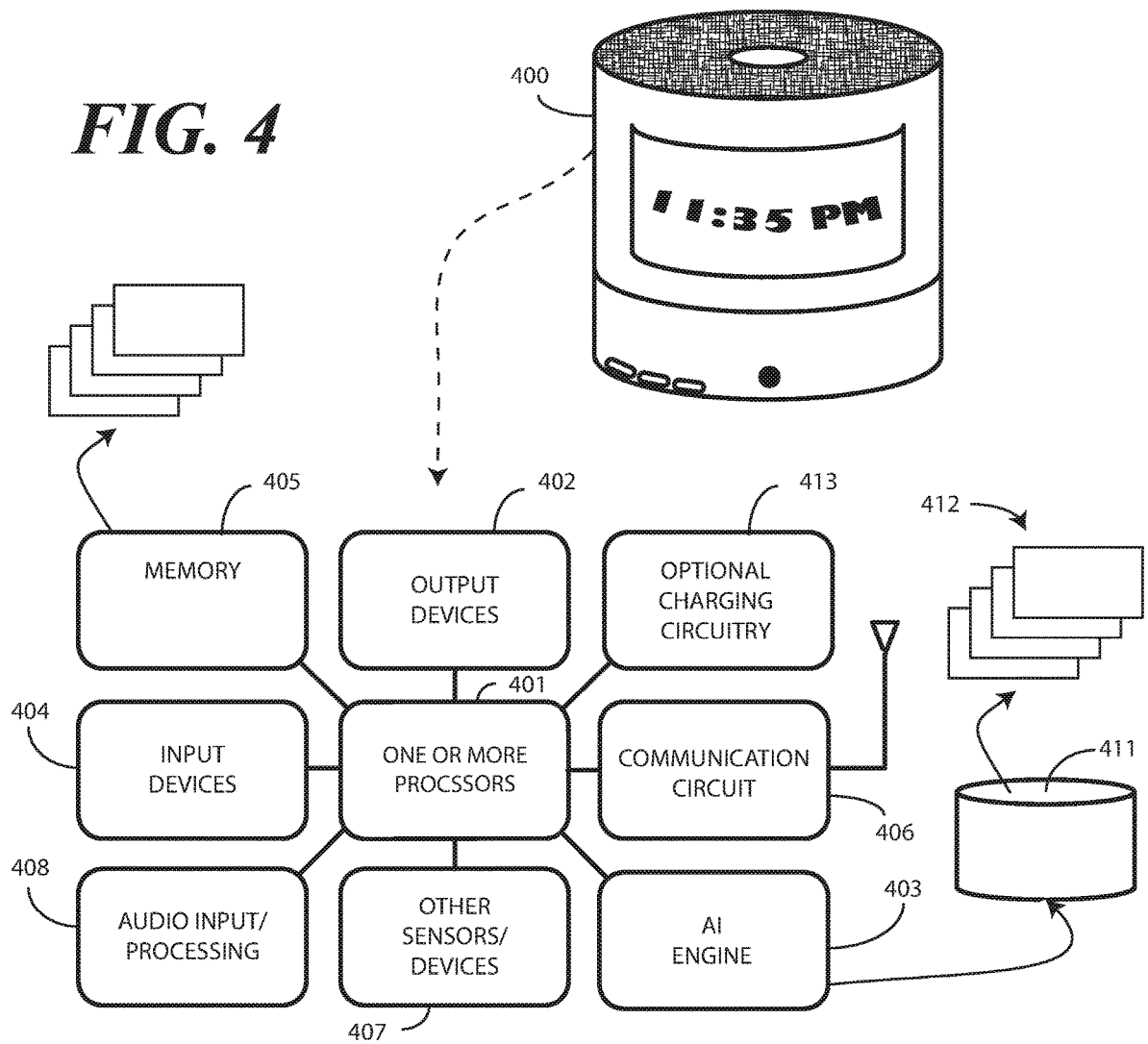
FIG. 4 illustrates one explanatory Internet of things device in accordance with one or more embodiments of the disclosure.

Turning now to FIG. 4, illustrated therein are explanatory components that can be included in various combinations in an Internet-of-things device 400. It should be noted that different Internet-of-things devices will each include different sets of components, with their component combinations determined by application. A smart water meter, for example, will include different components that would a voice assistant device such as that shown in FIG. 4. Accordingly, the components of FIG. 4 are illustrative only to demonstrate various features and functions that an illustrative Internet-of-things device may include. Other configurations for task specific Internet-of-things devices will be obvious to those of ordinary skill in the art having the benefit of this disclosure.

In one or more embodiments, the Internet-of-things device 400 includes one or more processors 401. The one or more processors 401 is operable with one or more output components 402, which can include an optional display, loudspeakers, lights, or other visual or aural output devices in accordance with embodiments of the disclosure. The one or more processors 401 can include a microprocessor, a group of processing components, one or more ASICs, programmable logic, or other type of processing device. The one or more processors 401 can be operable with the various components of the electronic devices configured in accordance with embodiments of the disclosure. The one or more processors 401 can be configured to process and execute executable software code to perform the various functions of the electronic devices configured in accordance with embodiments of the disclosure.

In one or more embodiments, the one or more processors 401 can include, or be operable with, an artificial intelligence engine 403. The artificial intelligence engine 403 can be operable with the input devices 404 of the Internet-of-things device 400, which can include one or more microphones, one or more image capture devices, depth scanners, temperature sensors, or other input devices. The artificial intelligence engine 403 is capable of machine learning, which can include a series of processes for ingesting information and finding patterns, formulas, models, or other constructs that describe the information. These processes can represent and/or generalize the information in one or more embodiments. Representation can include data evaluation, while generalization can include processing additional information. Predictions can be used to provide answers to inquiries. For example, the one or more processors 401 of the Internet-of-things device 400 may inquire why so much water is flowing into a home. When an answer is given in the form of event data received in an event report from unmanned aircraft, processes predicting informational meanings, comparing predicted answers and actual answers, and updates of prediction functions in view of determined distances can occur repeatedly, thereby enabling the Internet-of-things device 400 to link usage profiles and signatures detected within its sensor range with sources of consumption or other events occurring beyond its sensor range. These processes can be constructed as one or more workflows within the artificial intelligence engine 403 in one embodiment.

Knowledge domains, such as the Internet-of-things knowledge domain described above, can be stored in a knowledge domain database 411. Inputs, event data, event reports, control settings, and other information can be transformed via workflows or algorithms into knowledge domains 412 in the knowledge domain database 411. The artificial intelligence engine 403 can perform self-learning operations using these knowledge domains 412. The artificial intelligence engine 403 can perform self-learning operations using various algorithms, transforming data to an execution code level, executing algorithms, and transforming the results into knowledge as well.

The knowledge domain database 411 can comprise an aggregation of learned knowledge, including all information ingested by the artificial intelligence engine 403. When, for example, information is abstracted and classified based on user and domain type, the information can be transformed into machine-learned knowledge, which can be stored in the knowledge domain database 411.

In one or more embodiments, event data (134) in event reports (133) received from unmanned aircraft (105) are used as a learning aid for the artificial intelligence engine 403 to improve recognition of specific types of events. For example, in one or more embodiments the artificial intelligence engine 403 can more readily identify events occurring outside its sensor range, by detecting conditions within its sensor range, as a function of event data (134) in event reports (133) received from unmanned aircraft (105). In one or more embodiments, the artificial intelligence engine 403 of the Internet-of-things device 400 is constantly receiving data, and therefore "knowledge," from the event data (134) in event reports (133) received from unmanned aircraft (105). Thus, the Internet-of-things device 400 "smartly interacts" with the unmanned aircraft (105). In one or more embodiments, this allows the Internet-of-things device 400 to be aware of events outside of its sensor range.

Thus, the artificial intelligence engine 403 improves the contextual control capability of the Internet-of-things device 400 by actively monitoring and learning from event data (134) in event reports (133) received from unmanned aircraft (105). In one or more embodiments, the artificial intelligence engine 403 can infer new event occurrences from event data (134) in event reports (133) received from unmanned aircraft (105). In another embodiment, the artificial intelligence engine 403 allows the Internet-of-things device 400 to predict user behavior in response to event data (134) in event reports (133) received from unmanned aircraft (105).

A storage device, such as memory 405, can optionally store the executable software code used by the one or more processors 401 during operation. The memory 405 can also house the knowledge domain database 411. The memory 405 may include either or both static and dynamic memory components, may be used for storing both embedded code and user data. The software code can embody program instructions and methods to operate the various functions of the Internet-of-things device 400 and/or artificial intelligence engine 403 configured in accordance with embodiments of the disclosure, and also to execute software or firmware applications and modules. The one or more processors 401 can execute this software or firmware, and/or interact with modules, to provide device functionality.

In one or more embodiments, the Internet-of-things device 400 is programmed such that the one or more processors 401 and memory 405 interact with the other components of the Internet-of-things device 400 to perform certain functions. The one or more processors 401 may include or implement various modules and execute programs for initiating different activities such as controlling connected Internet-of-things devices, transferring data, and communicating with unmanned aircraft (105) as described herein. Illustrating by example, the one or more processors 401 implement the artificial intelligence engine 403 in one or more embodiments. The artificial intelligence engine 403 can then use event data (134) in event reports (133) received from unmanned aircraft (105) to advance its learning.

In one or more embodiments, the Internet-of-things device 400 includes a communication device 406 that is configured for wireless communication, as well as optionally configured for wired communication. The communication device 406 can communicate with one or more other devices, domains, or networks. In one or more embodiments, the communication device 406 communicates with unmanned aircraft (105), as noted above.

In one or more embodiments, the communication device 406 can be configured to communicate with any of the following: a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication device 406 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication device 406 can include wireless communication circuitry, one of a receiver, a transmitter, or transceiver, and one or more antennas.

The one or more processors 401 can also be operable with other components 407. The other components 407 can include an acoustic detector 408, such as a microphone. The other components 407 can also include one or more proximity sensors to detect the presence of nearby objects. The other components 407 may include video input components such as optical sensors, mechanical input components such as buttons, touch pad sensors, touch screen sensors, capacitive sensors, motion detectors, and switches.

Similarly, the other components 407 can include output components 402 such as video, audio, and/or mechanical outputs. Other examples of output components 402 include audio output components such as speaker ports or other alarms and/or buzzers and/or a mechanical output component such as vibrating or motion-based mechanisms.

In one or more embodiments, the Internet-of-things device 400 includes charging circuitry 413 that allows it to function like a charging dock for the unmanned aircraft (105). In one or more embodiments, the Internet-of-things device 400 includes an inductive charging surface that is devoid of electrical contacts and that allows charging of the unmanned aircraft (105) when the unmanned aircraft (105) lands upon the inductive charging surface. The charging circuitry 413 can deliver voltage and/or current to an electrical coupler of the unmanned aircraft (105) to allow its energy storage device to charge, for example.

As noted above, it is to be understood that the Internet-of-things device 400 of FIG. 4 is illustrative only, and is not intended to be a complete schematic diagram of the various components required to construct a Internet-of-things device 400 configured in accordance with one or more embodiments of the disclosure. Therefore, other Internet-of-things devices configured in accordance with embodiments of the disclosure may include various other components not shown in FIG. 4, or may include a combination of two or more components or a division of a particular component into two or more separate components, and still be within the scope of the present disclosure.

Figure 6:
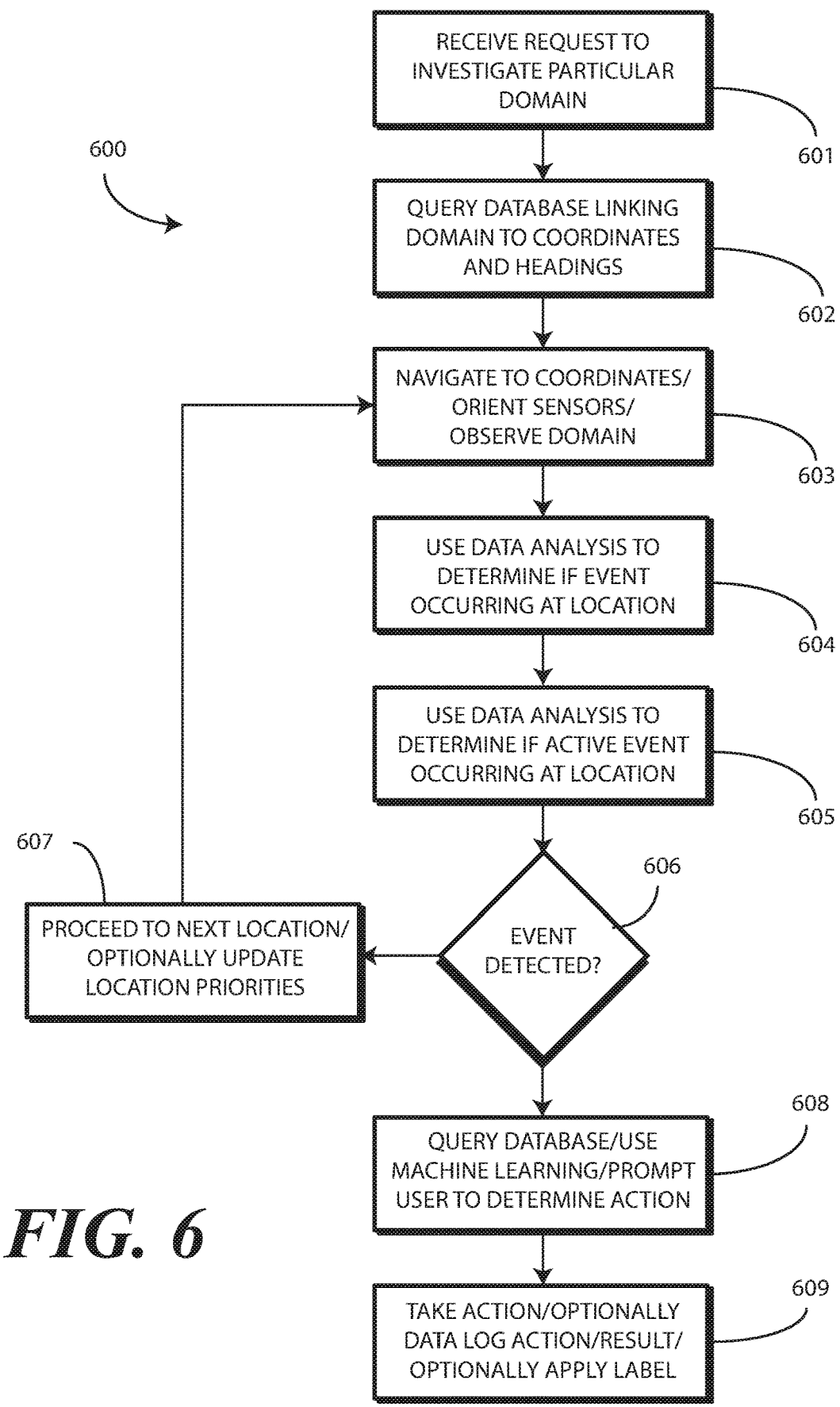
FIG. 6 illustrates one explanatory method in accordance with one or more embodiments of the disclosure.

Turning now to FIGS. 6-9, illustrated therein are various methods that can be implemented using the hardware devices and systems described above with reference to FIGS. 1, 2, 4, and 5. Beginning with FIG. 6, illustrated therein is a method 600 for controlling unmanned aircraft in accordance with one or more embodiments of the disclosure. At step 601, the method 600 receives, with a wireless communication device of the unmanned aircraft, an investigation request from an Internet-of-things device.

In one or more embodiments, the investigation request received at step 601 comprises a request to investigate a particular domain defined by the Internet-of-things device transmitting the request. In one embodiment, the investigation request received at step 601 comprises an identification of a class of event to be investigated. In one or more embodiments, the investigation request received at step 601 comprises an identification that the class of event is occurring at a location that is beyond a sensor range of the Internet-of-things device transmitting the investigation request received at step 601.

If, for example, the Internet-of-things device transmitting the investigation request received at step 601 is a water meter that detects excessive water flow into the home, the investigation request received at step 601 may request the investigation of an aquatic domain that includes all faucets, tubs, toilets, washing machines, sinks, and so forth. By contrast, if the investigation request received at step 601 is from a security camera, the investigation request received at step 601 may request the investigation of a different domain, e.g., all windows and doors of the home. If the Internet-of-things device transmitting the investigation request received at step 601 is a fire security system, the investigation request received at step 601 may request the investigation of a geographic domain surrounding a smoke detector that is actively alerted, and so forth.

At step 602, the method 600 determines one or more investigation locations as a function of the investigation request. This step 602 can occur in a variety of ways. In one embodiment, step 602 comprises one or more processors of the unmanned aircraft querying a database stored in memory that links the domain identified by the investigation request received at step 601 to a list of coordinates and headings of the domain where the event may occur.

In another embodiment, the investigation request received at step 601 identifies a plurality of investigation locations from the Internet-of-things device transmitting the investigation request. Accordingly, step 602 can comprise simply reading the plurality of investigation locations from the investigation request received at step 601 in one or more embodiments.

In still another embodiment, step 602 comprises querying event data stored in a memory of the unmanned aircraft. In one or more embodiments, this event data identifies one or more locations where the one or more sensors of the unmanned aircraft have previously detected the class of event occurring. Thus, by searching its previous investigation history, one or more processors of the unmanned aircraft can determine the locations at step 602 as well. Other techniques for determining the one or more locations at step 602 as a function of the investigation request received at step 601 will be obvious to those of ordinary skill in the art having the benefit of this disclosure.

At step 603, the unmanned aircraft navigates, with a flight engine of the unmanned aircraft, to at least one investigation location. In one embodiment, the at least one navigation location of step 603 is selected from the one or more investigation locations determined at step 602.

At step 604, the unmanned aircraft monitors, with one or more sensors of the unmanned aircraft, an environment at the at least one investigation location. At decision 606, one or more processors of the unmanned aircraft determine whether a class of event is occurring at the at least one investigation location. Where the class of event fails to occur at the at least one investigation location as determined at decision 606, step 607 comprises navigating, with the flight engine, to at least one other investigation location. This process can repeat until the class of event is detected or the plurality of locations is exhausted.

Where the class of event is, or was, occurring at the at least one navigation location, step 608 can comprise the one or more processors of the unmanned aircraft querying a database, or alternatively using machine learning, to autonomously determine, or alternatively prompt a user, to determine the appropriate action to take for the detected class of event. At step 609, the one or more processors cause the appropriate action to occur.

The appropriate action selected at step 608 and taken at step 609 can take a variety of forms. In one or more embodiments, the action taken at step 609 comprises recording, with the one or more sensors of the unmanned aircraft, event data confirming that the class of event is or was occurring at the at least one investigation location. In one or more embodiments, the action taken at step 609 comprises transmitting, with a wireless communication device of the unmanned aircraft, an event report comprising the event data to the Internet-of-things device transmitting the investigation request received at step 601. In one or more embodiments, the event report transmitted at step 609 confirms that the class of event is or was occurring at the at least one investigation location.

In one or more embodiments, the action taken at step 609 comprises applying, with the one or more processors of the unmanned aircraft, one or more labels to the event data in the event report. In one or more embodiments, this application of labels at step 609 occurs prior to transmitting the event report. In one or more embodiments, the one or more labels identify the class of event. In one or more embodiments, the one or more labels identify confirm that the class of event is or was occurring at the at least one investigation location. In one or more embodiments the one or more labels are configured for transformation into machine learned knowledge in an Internet-of-things knowledge domain of an artificial intelligence engine of the Internet-of-things device transmitting the investigation request received at step 601.

Figure 7:
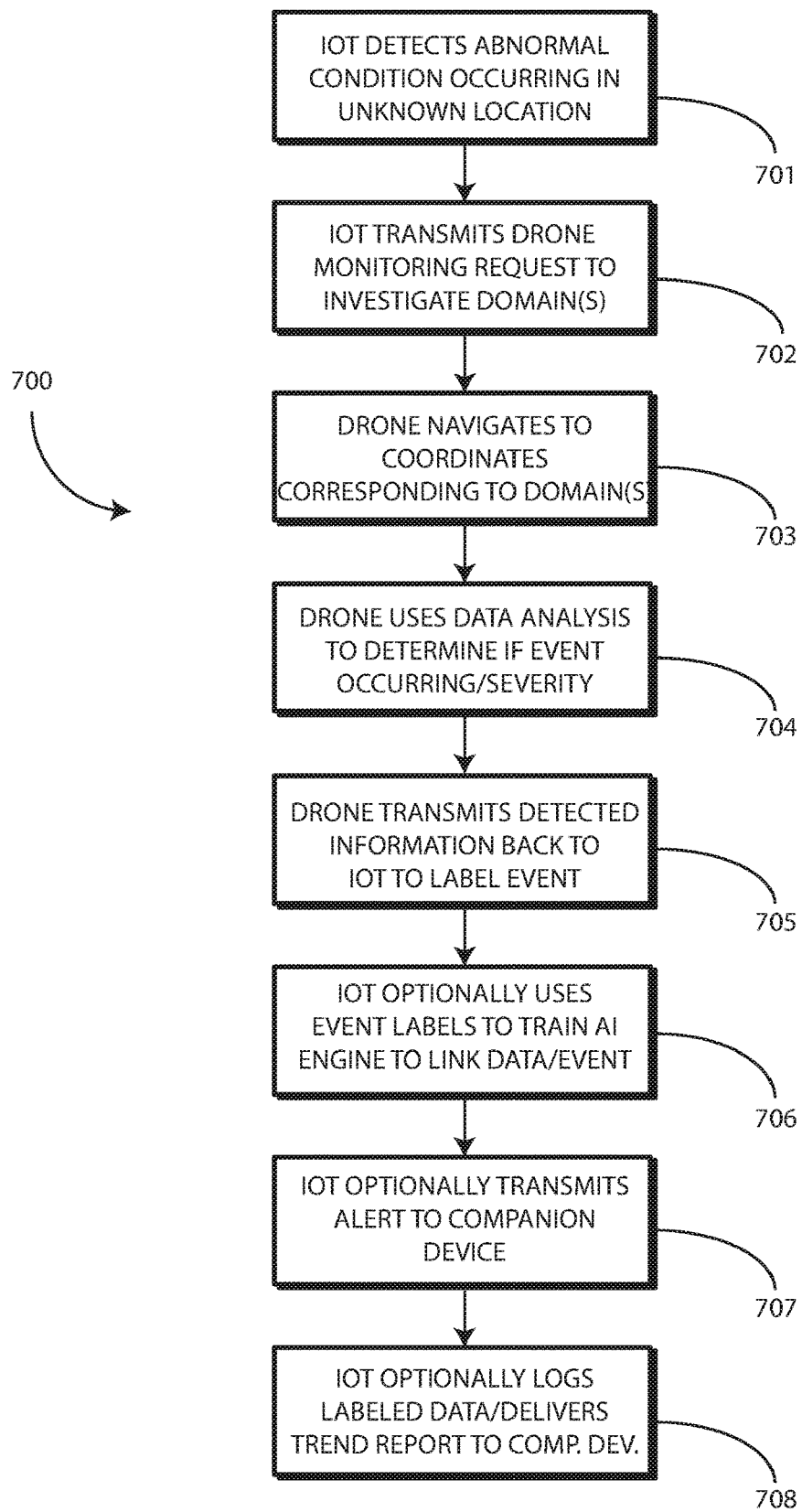
FIG. 7 illustrates another explanatory method in accordance with one or more embodiments of the disclosure.

Turning now to FIG. 7, illustrated therein is one explanatory method 700 for controlling an Internet-of-things device in accordance with one or more embodiments of the disclosure. The method 700 of FIG. 7 provides a method of training the Internet-of-things device to better correlate events occurring beyond its sensor range to conditions detected within its sensor range.

Beginning at step 701, the Internet-of-things device detects a conditional change occurring within its sensor range. Where, for example, the Internet-of-things device is a utility meter, it may detect, with its sensors in its sensor range, an increase or decreases in usage of a monitored resource, such as water, electricity, natural gas, and so forth. In some instances, the Internet-of-things device will detect an abnormal condition at step 701. Continuing with the example of a utility meter, the meter may detect an abnormally high amount of consumption of a monitored resource, which may indicate that something is awry within the home. If the home generally consumes X gallons of water per day, and a water meter detects X+N gallons being used at step 701, this may be flagged as a detected abnormally high amount of resource consumption. Thus, in one or more embodiments step 701 comprises detecting a change in an amount of consumption of a monitored resource beyond a predefined threshold, e.g., N gallons beyond the X per day typically consumed.

In one or more embodiments, step 701 further includes determining, with one or more processors of the Internet-of-things device, that the condition identified at step 701 is occurring at a location outside of an area monitored by the sensors of the Internet-of-things device. In the example of a water meter, the meter can detect water flow, but cannot detect where the water passing through the meter is being consumed within the home. Accordingly, the one or more processors can conclude, upon detecting the amount of consumption exceeding the predefined threshold, that the consumption is occurring outside of an area monitored by the flow sensors of the water meter.

Using another example, consider the situation that occurs when the Internet-of-things device is a security camera that also includes microphones, with the security camera positioned so that its field of view spans a door and adjacent window. If the microphones detect the sound of glass breaking, and the camera captures still or video images of the adjacent window being broken, one or more processors of the security camera would conclude at step 701 that this abnormal condition, i.e., the glass breakage, is occurring within an area being monitored by its primary sensor, which is the camera. By contrast, if the microphones detect the sound of glass breaking, and the camera captures still or video images of the door and adjacent window in normal condition, the one or more processors of the security camera would conclude at step 701 that the condition is occurring at a location outside of an area monitored by the sensors due to the fact that the sensors cannot gather enough data to determine the source of the condition.

At step 702, the Internet-of-things device transmits, with its communication device, an investigation request to an unmanned aircraft. In one or more embodiments, the investigation request sent at step 702 comprises a request to monitor an environment at the location. In one or more embodiments, the investigation request sent at step 702 comprises a request to investigate a particular domain, e.g., all water faucets, all space heaters, all stovetops, and so forth.

At step 703, one or more processors of the unmanned aircraft cause the flight engine to navigate the unmanned aircraft to at least one investigation location. In one or more embodiments, this navigation location is a location beyond the area monitored by the sensors of the Internet-of-things device. In one or more embodiments, this navigation occurs in response to receiving the investigation request.

In one or more embodiments, step 703 comprises the unmanned aircraft navigating to coordinates identified by the Internet-of-things device. For example, the Internet-of-things device may include in its investigation request transmitted at step 702 the coordinates for a particular domain, e.g., the kitchen sink, the guest bathroom sink, the bedroom sink, and so forth. In other embodiments, the one or more processors of the unmanned aircraft can autonomously determine one or more investigation locations by querying event data stored in a memory of the unmanned aircraft. In one or more embodiments, the event data identifies one or more locations where the one or more sensors of the unmanned aircraft have previously detected the class of event occurring. Other techniques for identifying locations for the unmanned aircraft to investigate will be obvious to those of ordinary skill in the art having the benefit of this disclosure.

At step 704, the one or more sensors of the unmanned aircraft monitor the area about the investigation location. In one or more embodiments, step 704 comprises recording event data. In one or more embodiments, step 704 comprises analyzing the event data captured to confirm whether a class of event is or was occurring at the investigation location. Step 704 can also include analyzing environmental data captured by the one or more sensors to determine an event severity corresponding to the class of event. The unmanned aircraft may, for example, use computer vision or sensor analysis to determine if a particular device, e.g., faucet or stove, is in use at step 704. If the device is in use, step 704 can include determining the mode and/or level of usage, e.g., whether the faucet is fully on or dripping, or whether the stove is on a simmer setting or a high setting, and so forth.

At step 705 the one or more processors of the unmanned aircraft compile this event data an/or environmental data into an event report. In one or more embodiments, step 705 further includes applying, with the one or more processors, one or more labels to the event data in the event report. These labels can identify the class of event, the severity of event, other activities or events occurring concurrently with the event. Moreover, in one or more embodiments the labels can confirm that the class of event is or was occurring at the at least one investigation location. At step 705, the one or more processors of the unmanned aircraft cause the wireless communication circuit of the unmanned aircraft to transmit an event report to the Internet-of-things device transmitting the investigation request at step 702.

At step 706, the Internet-of-things device receives the event report. In one or more embodiments, the event labels in the event report are configured for transformation into machine learned knowledge in an Internet-of-things knowledge domain of an artificial intelligence engine of the Internet-of-things device transmitting the investigation request. Accordingly, in one or more embodiments step 705 comprises transforming, with an artificial intelligence engine of the Internet-of-things device, the one or more event labels into machine learned knowledge in an Internet-of-things knowledge domain within the Internet-of-things device. For example, the Internet-of-things device can use the event labels to train a machine-learning engine to link the resource consumption profile and/or signature to a correct source of consumption.

At step 707, the Internet-of-things device can optionally alert a user if the source of the event is unexpected. In one or more embodiments, step 707 comprises transmitting, using the communication device of the Internet-of-things device, an event alert notification to a remote electronic device identifying that the class of event is or was occurring at the location. Illustrating by example, the Internet-of-things device may send a text message or a multimedia message to a smartphone belonging to the user indicating that the toilet is continually running or that a pipe has burst, and so forth.

At step 708, the Internet-of-things device can optionally compile the event labels from the event report with other event labels received in other event reports into a class of event trend log. In one or more embodiments, step 708 comprises also transmitting, using the communication device of the Internet-of-things device, the class of event trend log to a remote electronic device. For instance, the Internet-of-things device can log the tagged event data and can share a class of event trend log sharing resource consumption trends with the user.

Thus, the method 700 of FIG. 7 provides steps to create databases, Internet-of-things domains, or other data structures within the Internet-of-things device that map remote locations, i.e., areas beyond the sensor range of the Internet-of-things device, which link similar events into domains and define their relative locations, e.g., what rooms, what floors, what water sources, what doors, what smoke detectors, and so forth. In one or more embodiments, the Internet-of-things device can reference an event history created by its artificial intelligence engine as a function of received event reports to better pinpoint possible events and event locations for future investigation requests that it transmits to unmanned aircraft. The Internet-of-things device can both send better future investigation requests and can better report to users likely sources within each domain as a function of the event reports received from unmanned aircraft and processed in the artificial intelligence engine. The Internet-of-things device can thus become "smarter" as a function of learned history, time of day, context, indoor/outdoor environment, people present, and other factors. Other advantages of embodiments of the disclosure will be obvious to those of ordinary skill in the art having the benefit of this disclosure.

Figure 8:
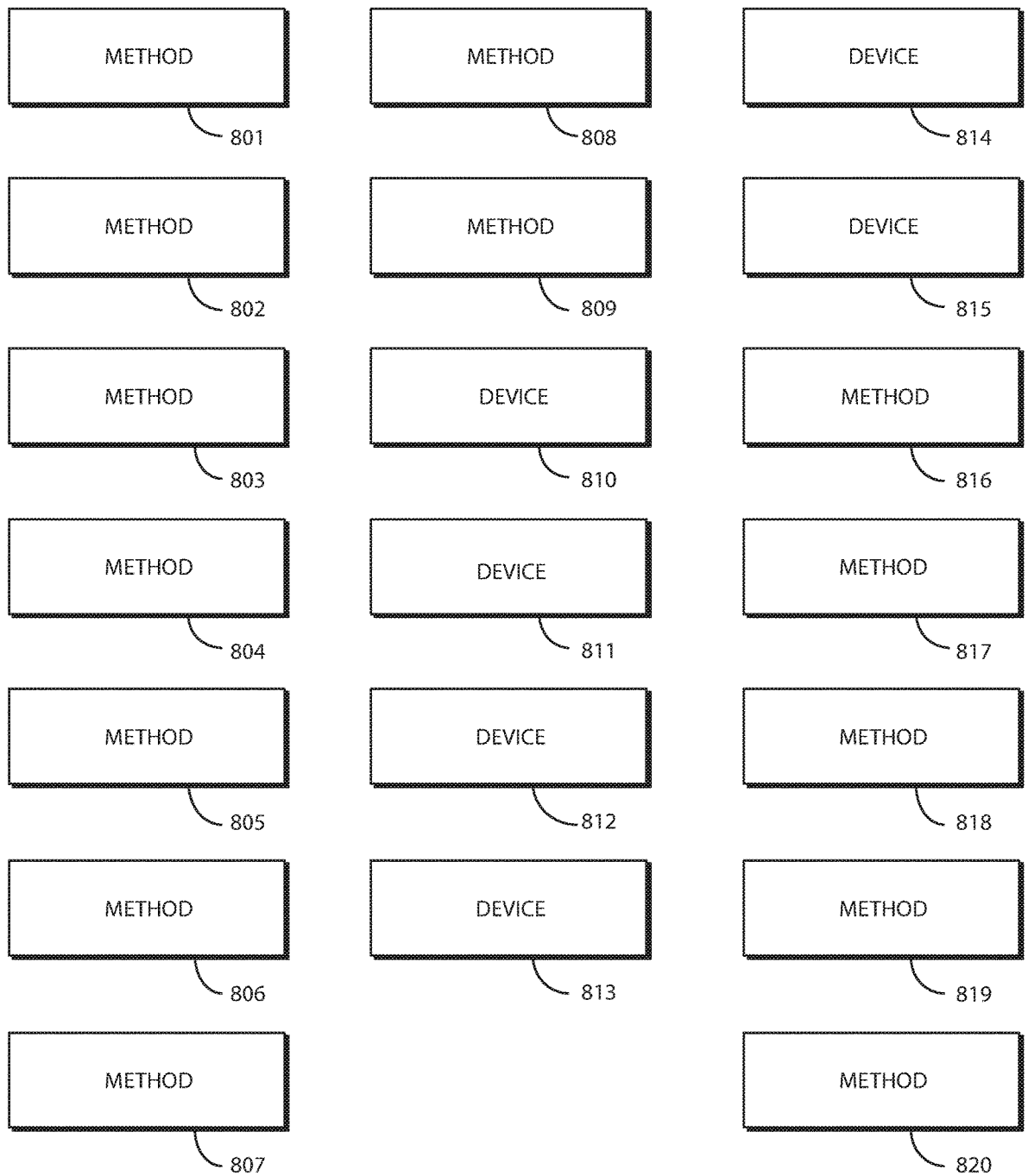
FIG. 8 illustrates one or more embodiments of the disclosure.

Turning now to FIG. 8, illustrated therein are various embodiments of the disclosure. At 801, a method of controlling an unmanned aircraft comprises receiving, with a wireless communication device of the unmanned aircraft, an investigation request from an Internet-of-things device. At 801, the method comprises determining, with one or more processors of the unmanned aircraft, one or more investigation locations as a function of the investigation request. At 801, the method comprises navigating, with a flight engine of the unmanned aircraft, to at least one investigation location selected from the one or more investigation locations.

At 801, the method comprises monitoring, with one or more sensors of the unmanned aircraft, an environment at the at least one investigation location. At 801, the method comprises determining, with the one or more processors, whether a class of event is occurring at the at least one investigation location. At 801, and where the class of event is occurring at the at least one investigation location, the method comprises recording, with the one or more sensors, event data confirming that the class of event is or was occurring at the at least one investigation location and transmitting, with the wireless communication device, an event report comprising the event data confirming that the class of event is or was occurring at the at least one investigation location to the Internet-of-things device transmitting the investigation request.

At 802, the method of 801 further comprises applying, with the one or more processors, one or more labels to the event data in the event report prior to transmitting the event report. At 803, the one or more labels of 802 identify the class of event. At 803, the one or more labels of 802 confirm that the class of event is or was occurring at the at least one investigation location. At 804, the one or more labels of 803 are configured for transformation into machine-learned knowledge in an Internet-of-things knowledge domain of an artificial intelligence engine of the Internet-of-things device transmitting the investigation request.

In one or more embodiments, the unmanned aircraft can also assess the potential reason for an event and update the Internet-of-things devices. Illustrating by example, one or more processors might conclude excess humidity is correlated with currently occurring outside weather and should be dismissed. Similarly, the one or more processors may conclude that an in-wall pipe clicking noise is occurring due to cold weather and should be dismissed. If a glass breaking sound is happening with kids playing and present in the area, this alert may need to be dismissed. In one or more embodiments, the unmanned aircraft performs an analysis on received investigation requests to assess the level of seriousness, rather than just blindly responding.

At 805, the method of 803 further comprises, where the class of event fails to occur at the at least one investigation location, navigating, with the flight engine, to at least one other investigation location.

At 806, the investigation request of 801 identifies the class of event. At 807, the investigation request of 806 identifies that the class of event is occurring at a location that is beyond a sensor range of the Internet-of-things device.

At 808, the determining of the one or more investigation locations of 807 comprises receiving a plurality of investigation locations from the Internet-of-things device transmitting the investigation request. At 809, the determining of the one or more investigation locations of 807 comprises querying event data stored in a memory of the unmanned aircraft. At 809, the event data identifies one or more locations where the one or more sensors of the unmanned aircraft have previously detected the class of event occurring.

At 810, an unmanned aircraft comprises an unmanned aircraft body. At 810, an unmanned aircraft comprises a flight engine coupled to the unmanned aircraft body. At 810, an unmanned aircraft comprises one or more sensors coupled to the unmanned aircraft body. At 810, an unmanned aircraft comprises one or more processors operable with the one or more sensors. At 810, an unmanned aircraft comprises a wireless communication circuit operable with the one or more processors.

At 810, the wireless communication circuit receives an investigation request from an Internet-of-things device. At 810, the investigation request requests the unmanned aircraft to investigate an area beyond another area monitored by the Internet-of-things device.

At 810, the one or more processors cause the flight engine to navigate the unmanned aircraft to at least one investigation location beyond the other area in response to the investigation request. At 810, the one or more processors cause the one or more sensors to record event data confirming that a class of event is or was occurring at the at least one investigation location. At 810, the one or more processors cause the wireless communication circuit to transmit an event report comprising the event data to the Internet-of-things device. At 810, the event report identifies the class of event is or was occurring at the at least one investigation location.

At 811, the one or more processors of 810 further apply one or more event labels to the event data in the event report. At 812, the one or more event labels of 811 identify the class of event. At 813, the one or more processors of 812 further analyze environmental data captured by the one or more sensors and determine an event severity corresponding to the class of event. At 814, the one or more event labels of 813 identify the event severity corresponding to the class of event. At 815, the one or more labels of 812 identify whether the class of event is actively occurring at the at least one investigation location.

At 816, a method of controlling an Internet-of-things device comprises detecting, with one or more sensors of the Internet-of-things device, a condition exceeding a predefined condition threshold. At 816, the method comprises determining, with one or more processors of the Internet-of-things device, the condition is occurring at a location outside of an area monitored by the one or more sensors.

At 816, the method comprises transmitting, using a communication device of the Internet-of-things device, an investigation request to an unmanned aircraft. At 816, the investigation request comprises a request to monitor an environment at the location.

At 816, the method comprises receiving, with the communication device, an event report identifying whether a class of event is or was occurring at the location from the unmanned aircraft. At 816, the event report comprises one or more event labels.

At 817, the method of 816 comprises transforming, with an artificial intelligence engine of the Internet-of-things device, the one or more event labels into machine learned knowledge in an Internet-of-things knowledge domain. At 818, the Internet-of-things device of 817 comprises a utility meter.

At 819, the method of 817 further comprises also transmitting, using the communication device, an event alert notification to a remote electronic device identifying that the class of event is or was occurring at the location. At 820, the method of 817 further comprises compiling the event labels from the event report with other event labels received in other event reports into an class of event trend log and also transmitting, using the communication device, the class of event trend log to a remote electronic device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of controlling an unmanned aircraft, the method comprising:

receiving, with a wireless communication device of the unmanned aircraft, an investigation request from an Internet-of-things device, the investigation request identifying a class of event is occurring at a location that is beyond a sensor range of the Internet-of-things device;

determining, with one or more processors of the unmanned aircraft, one or more investigation locations as a function of the investigation request;

navigating, with a flight engine of the unmanned aircraft, to at least one investigation location selected from the one or more investigation locations;

monitoring, with one or more sensors of the unmanned aircraft, an environment at the at least one investigation location;

determining, with the one or more processors, whether the class of event is occurring at the at least one investigation location; and where the class of event is occurring at the at least one investigation location:
recording, with the one or more sensors, event data confirming that the class of event is or was occurring at the at least one investigation location; and
transmitting, with the wireless communication device, an event report comprising the event data confirming that the class of event is or was occurring at the at least one investigation location to the Internet-of-things device transmitting the investigation request.

2. The method of claim 1, the Internet-of-things device comprising a utility meter situated outside a home.

3. The method of claim 2, the at least one investigation location situated within the home.

4. The method of claim 3, the class of event comprising water consumption within the home.

5. The method of claim 1, further comprising, where the class of event fails to occur at the at least one investigation location, navigating, with the flight engine, to at least one other investigation location.

6. The method of claim 1, the determining the one or more investigation locations comprising receiving a plurality of investigation locations from the Internet-of-things device transmitting the investigation request.

7. The method of claim 1, the determining the one or more investigation locations comprising querying event data stored in a memory of the unmanned aircraft, the event data identifying one or more locations where the one or more sensors of the unmanned aircraft have previously detected the class of event occurring.

8. An unmanned aircraft, comprising:
an unmanned aircraft body;
a flight engine coupled to the unmanned aircraft body;
one or more sensors coupled to the unmanned aircraft body;
one or more processors operable with the one or more sensors; and
a wireless communication circuit operable with the one or more processors;
the wireless communication circuit receiving an investigation request from an Internet-of-things device, the investigation request requesting the unmanned aircraft to investigate an area beyond another area monitored by the Internet-of-things device;
the one or more processors causing:
the flight engine to navigate the unmanned aircraft to at least one investigation location beyond the another area in response to the investigation request;
the one or more sensors to record event data confirming that a class of event is or was occurring at the at least one investigation location; and
the wireless communication circuit to transmit an event report comprising the event data to the Internet-of-things device, the event report identifying the class of event is or was occurring at the at least one investigation location.

9. The unmanned aircraft of claim 8, the one or more processors further applying one or more event labels to the event data in the event report.

10. The unmanned aircraft of claim 9, the one or more event labels identifying the class of event.

11. The unmanned aircraft of claim 10, the one or more processors further analyzing environmental data captured by the one or more sensors and determining an event severity corresponding to the class of event.

12. The unmanned aircraft of claim 11, the one or more event labels identifying the event severity corresponding to the class of event.

13. The unmanned aircraft of claim 10, the investigation request requesting the unmanned aircraft investigate the area beyond the another area monitored by the Internet-of-things device when at least two sensors of the Internet-of-things device reach conflicting conclusions as to whether the class of event is actively occurring at the at least one investigation location.

14. A method of controlling an Internet-of-things device, the method comprising:
detecting, with one or more sensors of the Internet-of-things device, a condition exceeding a predefined condition threshold;
determining, with one or more processors of the Internet-of-things device, the condition is occurring at a location outside of an area monitored by the one or more sensors; and
transmitting, using a communication device of the Internet-of-things device, an investigation request to an unmanned aircraft, the investigation request comprising a request to monitor an environment at the location; and
receiving, with the communication device, an event report identifying whether a class of event is or was occurring at the location from the unmanned aircraft, the event report comprising one or more event labels.

15. The method of claim 14, further comprising, further comprising transforming, with an artificial intelligence engine of the Internet-of-things device, the one or more event labels into machine learned knowledge in an Internet-of-things knowledge domain.

16. The method of claim 15, the Internet-of-things device comprising an outdoor utility meter.

17. The method of claim 15, further comprising also transmitting, using the communication device, an event alert notification to a remote electronic device identifying that the class of event is or was occurring at the location.

18. The method of claim 15, further comprising:
compiling the event labels from the event report with other event labels received in other event reports into an class of event trend log; and
also transmitting, using the communication device, the class of event trend log to a remote electronic device.

19. The method of claim 16, wherein the condition comprises consumption of a monitored resource and the predefined condition threshold indicates an abnormal amount of consumption of the monitored resource.

20. The method of claim 19, the monitored resource consisting essentially of water, the predefined condition threshold defining a volume of the water consumed per unit time.

* * * * *